United States Patent
Malhotra

(10) Patent No.: US 9,990,788 B2
(45) Date of Patent: *Jun. 5, 2018

(54) SYSTEMS AND METHODS FOR ANTICIPATORY LOCKING AND UNLOCKING OF A SMART-SENSOR DOOR LOCK

(71) Applicant: GOOGLE LLC, Mountain View, CA (US)

(72) Inventor: Mark Malhotra, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/786,511

(22) Filed: Oct. 17, 2017

(65) Prior Publication Data

US 2018/0040182 A1 Feb. 8, 2018

Related U.S. Application Data

(63) Continuation of application No. 15/188,877, filed on Jun. 21, 2016, now Pat. No. 9,811,959, which is a
(Continued)

(51) Int. Cl.
*G07C 9/00* (2006.01)
*H04L 12/28* (2006.01)
*H04W 12/08* (2009.01)

(52) U.S. Cl.
CPC ..... *G07C 9/00166* (2013.01); *G07C 9/00103* (2013.01); *G07C 9/00111* (2013.01);
(Continued)

(58) Field of Classification Search
CPC ............ G07C 9/00166; G07C 9/00103; G07C 9/00111; G07C 9/00174; G07C 9/00182;
(Continued)

(56) References Cited

U.S. PATENT DOCUMENTS 9,241,270 B1  1/2016  Logue
9,347,242 B2  5/2016  Cregg et al.
(Continued)

FOREIGN PATENT DOCUMENTS

EP  1868857 A1  12/2007
EP  2393071 B1  12/2011

OTHER PUBLICATIONS

Google, Extended European Search Report, EP 16171684.0, dated Nov. 7, 2016, 11 pgs.
(Continued)

*Primary Examiner* — Ali Neyzari
(74) *Attorney, Agent, or Firm* — Morgan, Lewis & Bockius LLP

(57) ABSTRACT

An electronic device associated with a lock device detects a trigger event related to security of a smart home environment, determines a target state of the lock device based on the trigger event, and determines a current state of the lock device. A notification is sent to a user device including an indication of the trigger event and a prompt for an override input, and instructions to operate the lock device are either provided or not provided to the lock device based on a result of a comparison of the target state with the current state, and further based on a received override input or lack of a received override input.

20 Claims, 18 Drawing Sheets

Related U.S. Application Data continuation of application No. 14/726,144, filed on May 29, 2015, now Pat. No. 9,396,599.

(52) U.S. Cl.
CPC ..... *G07C 9/00174* (2013.01); *G07C 9/00182* (2013.01); *G07C 9/00309* (2013.01); *G07C 9/00571* (2013.01); *H04L 12/2803* (2013.01); *H04W 12/08* (2013.01); *G07C 9/00896* (2013.01); *G07C 9/00904* (2013.01); *G07C 2009/00769* (2013.01); *G07C 2209/62* (2013.01); *G07C 2209/63* (2013.01)

(58) Field of Classification Search
CPC ............ G07C 9/00309; G07C 9/00571; G07C 9/00896; G07C 9/00904; G07C 2009/00769; G07C 2209/03; H04L 12/2803; H04W 12/08
USPC .......................................................... 340/5.7
See application file for complete search history.

(56) References Cited

U.S. PATENT DOCUMENTS

| | | | |
|---|---|---|---|
| 9,396,599 | B1 | 7/2016 | Malhotra |
| 9,811,959 | B2 * | 11/2017 | Malhotra ........... G07C 9/00166 |
| 2012/0280783 | A1 | 11/2012 | Gerhardt et al. |
| 2015/0109104 | A1 | 4/2015 | Fadell et al. |
| 2015/0116075 | A1 | 4/2015 | Cregg et al. |
| 2015/0222517 | A1 | 8/2015 | McLaughlin et al. |
| 2015/0373022 | A1 | 12/2015 | Dubman et al. |
| 2016/0035196 | A1 | 2/2016 | Chan |

OTHER PUBLICATIONS

Chang, Your Door is About to Get Clever: 5 Smart Locks Compared, Wired Magazine, Jun. 19, 2013, 5 pgs.

Honorof, Genie Smart Lock Favors Door Handles, Tom's Guide, Jul. 17, 2014, 9 pgs, http://news.yahoo.com/genie-smart-lock-favors-door-173659946.html.

SHS-5120, Smart Door Lock, Elegant & Cutting Edge Design!, Samsung Smart Door Lock!, Jul. 25, 2014, 4 pgs, http://www.samsungsds-nss.com/?p=en_SHS5120.

Smart Door Lock, New Concept in Door Locks, Jul. 25, 2014, 3 pgs, http://www.samsungsds-nss.com/?p=en_sdl.

* cited by examiner

SYSTEMS AND METHODS FOR ANTICIPATORY LOCKING AND UNLOCKING OF A SMART-SENSOR DOOR LOCK

RELATED APPLICATIONS

This application is a continuation of U.S. patent application Ser. No. 15/188,877, filed Jun. 21, 2016, entitled "Systems and Methods for Anticipatory Locking and Unlocking of a Smart-Sensor Door Lock," which is a continuation of U.S. patent application Ser. No. 14/726,144, filed May 29, 2015, entitled "Systems and Methods for Anticipatory Locking and Unlocking of a Smart-Sensor Door Lock," all of which are hereby incorporated by reference in their entirety.

TECHNICAL FIELD

This relates generally to smart door locks, including but not limited to methods and systems for automatically locking and unlocking doors based on a variety of factors.

BACKGROUND

Electronic door locks offer the convenience of locking and unlocking doors without requiring a user to physically turn a key. Some electronic door locks include electromechanical components, such as battery-powered motors for actuating and retracting the bolt of the door lock. Consequently, electronic door locks have substantial limitations with respect to power consumption, particularly given the typical frequency with which electronic door locks are operated on a daily basis.

SUMMARY

Accordingly, there is a need for methods, systems, and interfaces for automatically determining a target state of a lock device when a trigger event is detected, and locking or unlocking the lock device accordingly. By utilizing inputs retrieved from one or more devices, such as smart devices with sensory capabilities positioned throughout an environment, a target state of the lock device is determined (e.g., locked/unlocked state) and instructions based on the determined target state are provided to the lock device if needed. Thus, the bolt of a lock device is actuated or retracted only if determined to be necessary—otherwise, the lock device maintains its current state. Average power consumption is therefore reduced while maintaining the advantages of typical electronic door locks.

In accordance with some implementations, a method is performed at an electronic device (e.g., a smart device in a smart home network) with one or more processors and memory storing instructions for execution by the one or more processors, wherein the electronic device is associated with a lock device. The method includes obtaining a number of users detected within a premises, and detecting a trigger event related to the lock device and the premises. When the trigger event is detected, a target state of the lock device is determined based on at least one of a plurality of factors. Factors include: (1) the obtained number of users detected within the premises, (2) respective security profiles of the one or more detected users, wherein a respective security profile of a respective user indicates a desired target state of the lock device when the respective user is within the premises, (3) a location of the one or more detected users; (4) a user state of the one or more detected users, wherein a respective user state of a respective user indicates that the respective user is asleep or active; and (5) a current premises mode, including an armed state and a disarmed state. A current state of the lock device is determined, and if the current state of the lock device and the target state of the lock device are not the same, instructions are provided to the lock device based on the target state of the lock device.

In accordance with some implementations, an electronic device (e.g., a smart device in a smart home network) includes one or more processors, memory, and one or more programs; the one or more programs are stored in the memory and configured to be executed by the one or more processors. The one or more programs include instructions for performing the operations of the method described above. In accordance with some implementations, a non-transitory computer-readable storage medium has stored therein instructions that, when executed by the electronic device, cause the electronic device to perform the operations of the method described above.

Thus, electronic devices are provided with more effective and efficient methods for automatically determining a target state of a lock device when a trigger event is detected, and locking or unlocking the lock device accordingly, thereby increasing the effectiveness and efficiency of such devices and systems.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
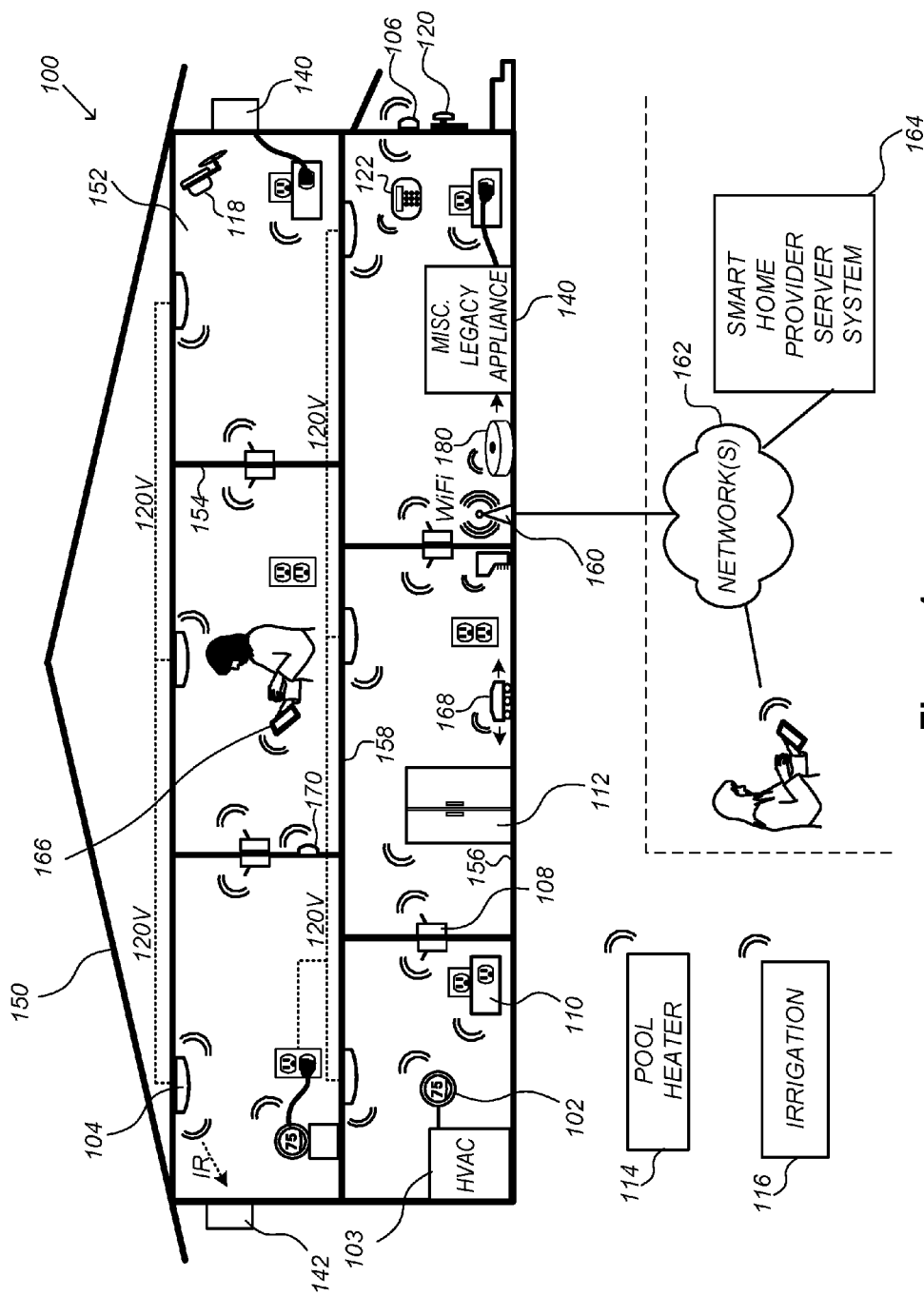
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first unlocked state could be termed a second unlocked state, and, similarly, a second unlocked state could be termed a first unlocked state, without departing from the scope of the various described implementations. The first unlocked state and the second unlocked state are both unlocked states, but they are not the same unlocked state.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space. Moreover, the techniques and methods disclosed herein can be used for locks other than locks for buildings, such as safes, storage units, tool boxes, gun cases, or security devices (e.g., bike locks, etc.).

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
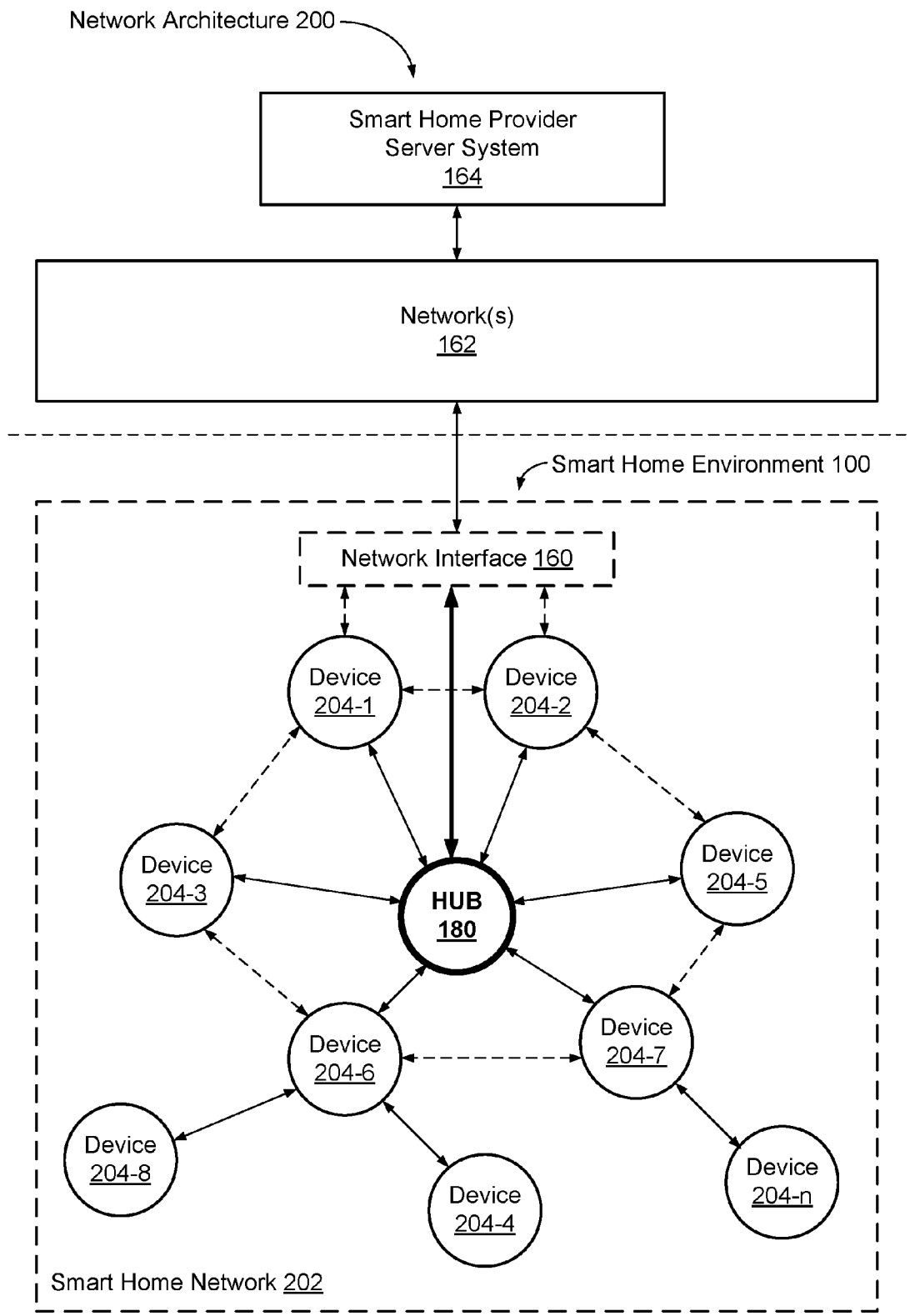
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
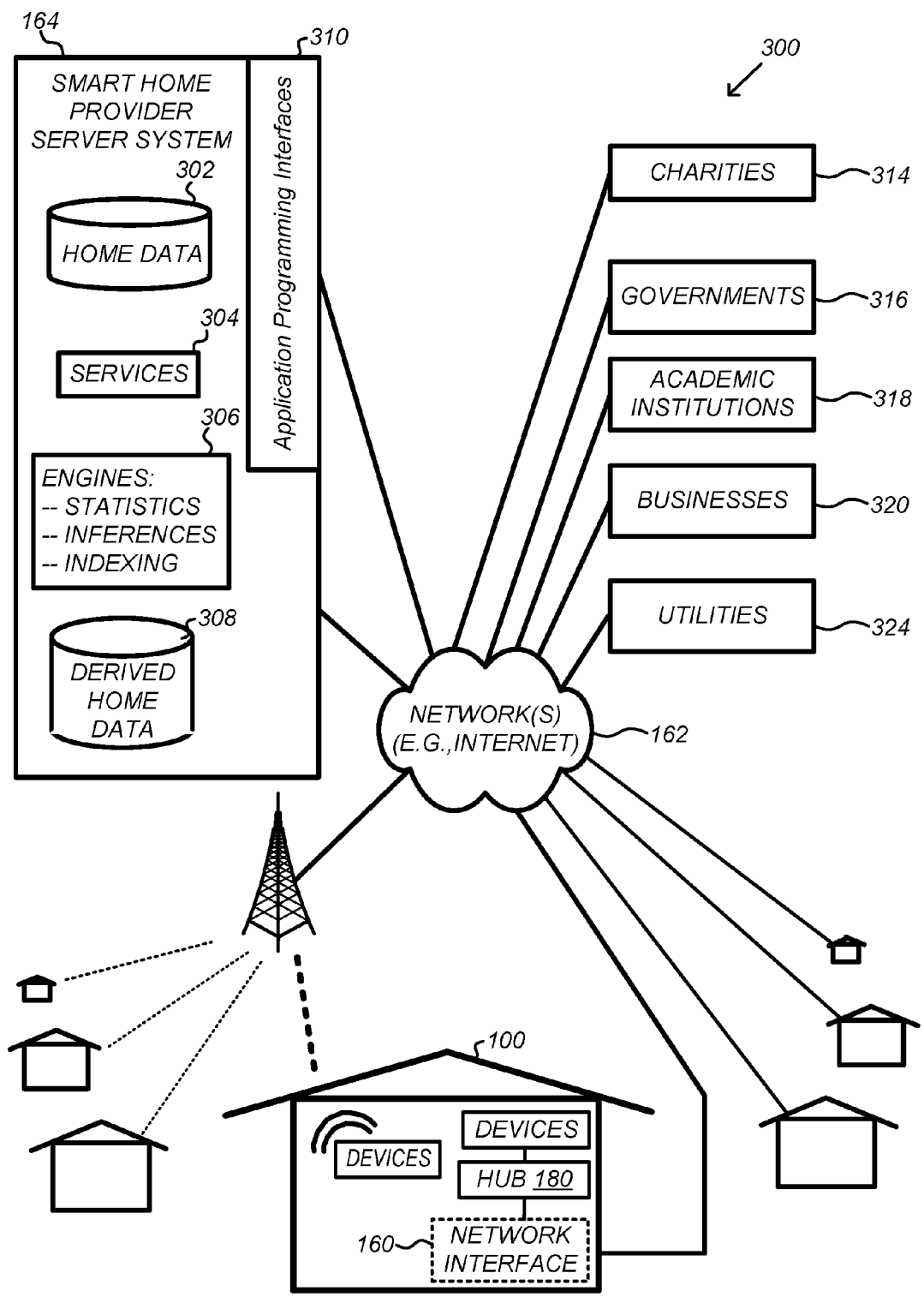
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
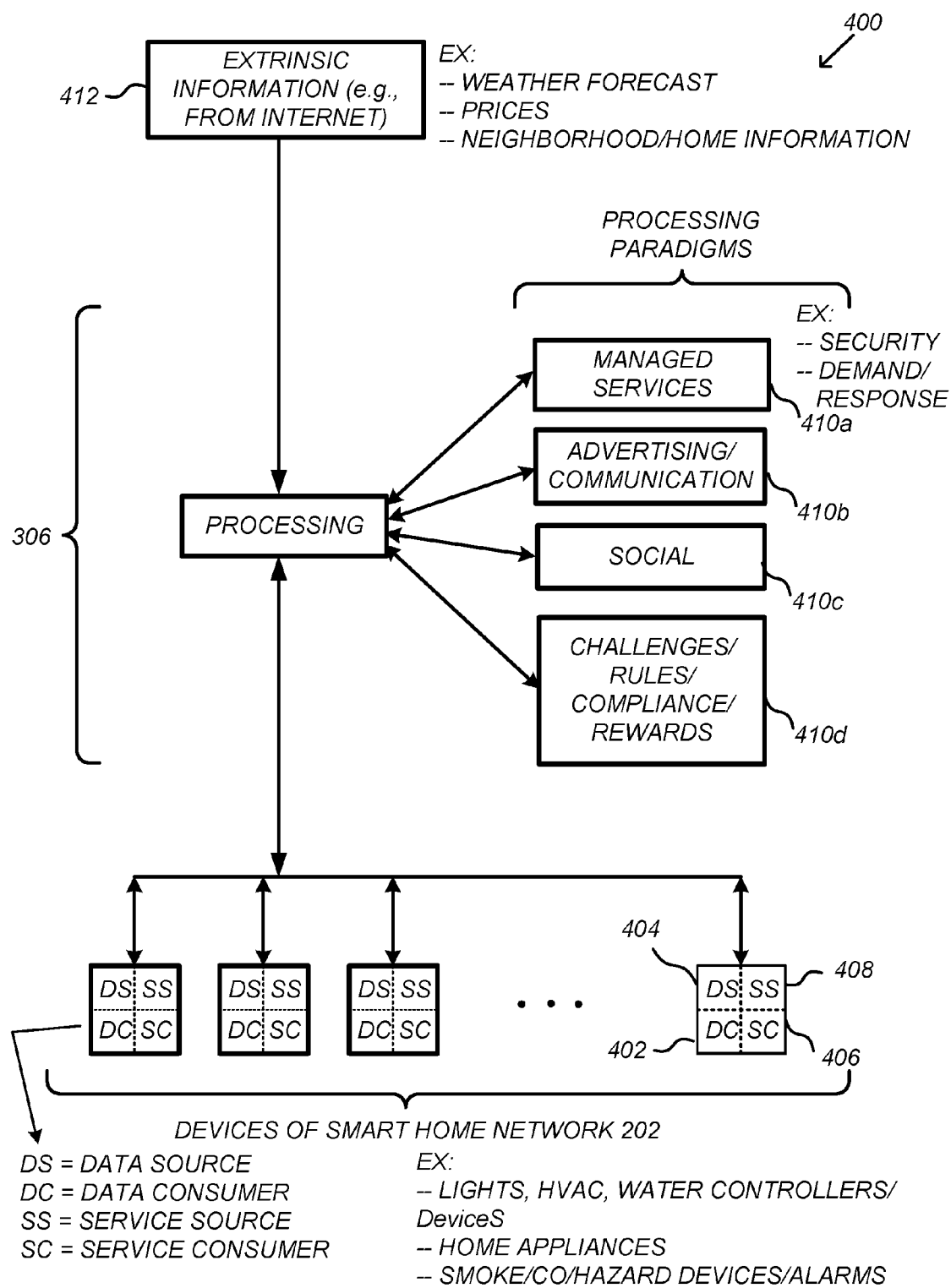
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside of a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
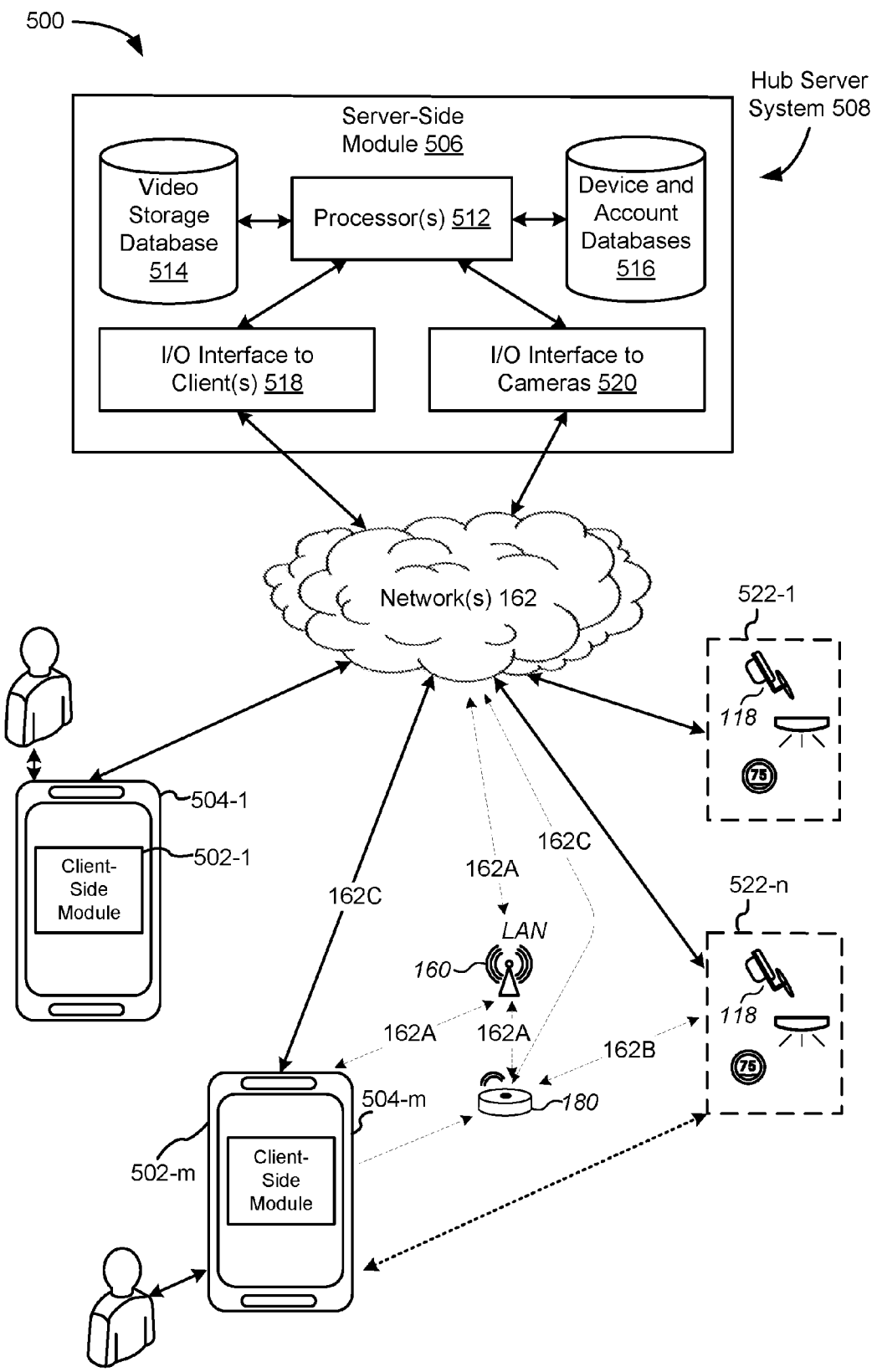
FIG. 5 is a representative operating environment in which a hub device server system interacts with client devices and hub devices communicatively coupled to local smart devices, in accordance with some implementations.

FIG. 5 illustrates a representative operating environment 500 in which a hub device server system 508 provides data processing for monitoring and facilitating review of motion events in video streams captured by video cameras 118. As shown in FIG. 5, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more reviewer accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508. In some implementations, the hub device server system 508 is a dedicated video processing server that provides video processing services to video sources and client devices 504 independent of other services provided by the hub device server system 508.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally, performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

As shown in FIG. 5, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 without no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-*m*) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-*n* exchange data with the hub device 180. Alternatively, in some situations, some of the electronic devices of the video sources 522-*n* communicate with the network interface device 160 directly via the same sub-network 162A that couples devices 160, 180 and 504-*m*. In some implementations (e.g., in the network 162C), both the client device 504-*m* and the electronic devices of the video sources 522-*n* communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-*n*. As explained above, the network interface device 160 and the hub device 180 optionally communicate with each other via a sub-network 162A.

Figure 6:
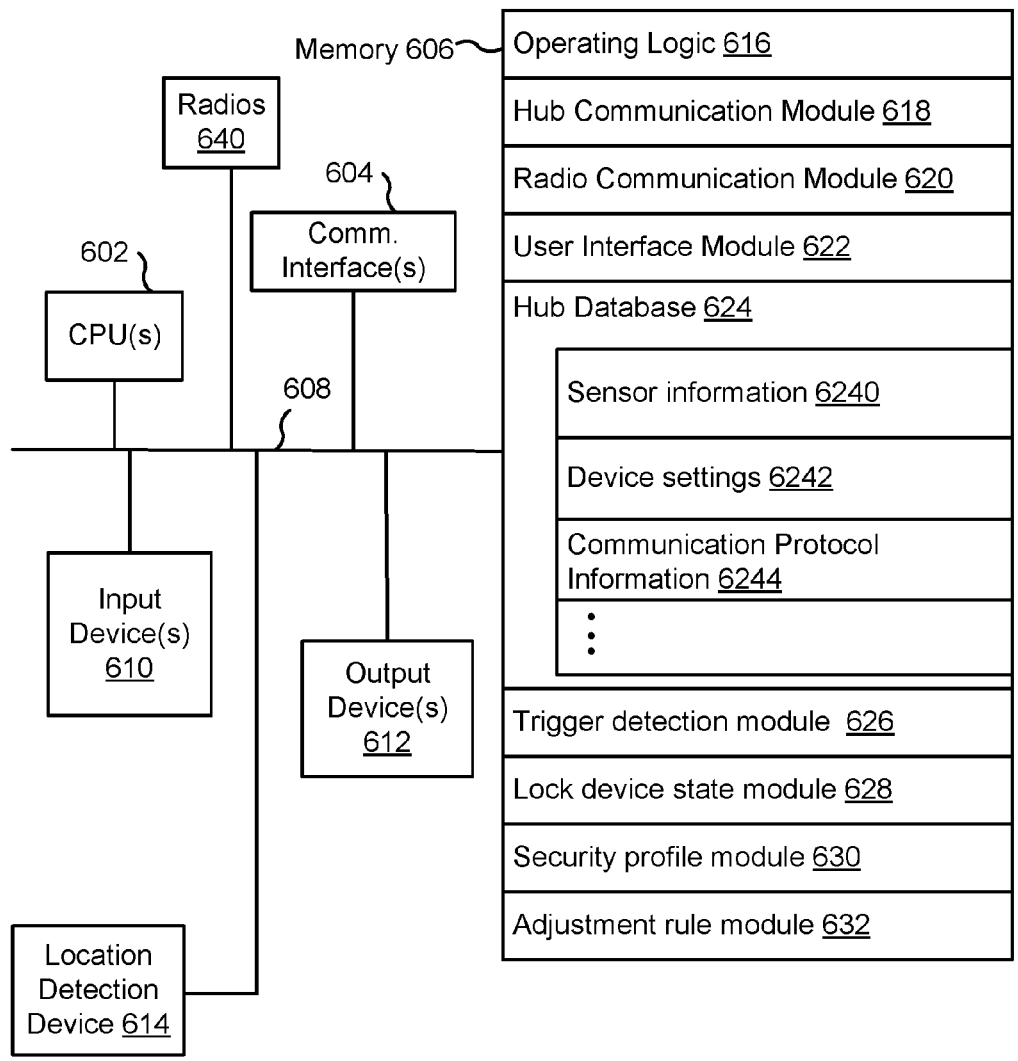
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/ or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

Operating logic 616 including procedures for handling various basic system services and for performing hardware dependent tasks;

Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);

Radio communication module 620 for connecting the hub device 180 to other devices (e.g., controller devices, smart devices 204 in smart home environment 100, client devices 504) via one or more radio communication devices (e.g., radios 640);

User interface module 622 for providing and displaying a user interface in which settings, captured data, and/or other data for one or more devices (e.g., smart devices 204 in smart home environment 100) can be configured and/or viewed, for displaying notifications of trigger events (e.g., the GUI and notification 1300 of FIG. 13A), and/or for detecting user inputs (e.g., user input indicating selection of a UI element, such as an override input); and Hub device database 624, including but not limited to:
Sensor information 6240 for storing and managing data received, detected, and/or transmitted by one or more sensors of the hub device 180 and/or one or more other devices (e.g., smart devices 204 in smart home environment 100);

Device settings 6242 for storing operational settings for one or more devices (e.g., coupled smart devices 204 in smart home environment 100); and Communication protocol information 6244 for storing and managing protocol information for one or more protocols (e.g., standard wireless protocols, such as ZigBee, Z-Wave, etc., and/or custom or standard wired protocols, such as Ethernet); and Trigger detection module 626 for detecting trigger events (e.g., using optional built-in sensors and inputs of the hub device 180, smart devices 204, and/or any other devices connected to the network 162) and providing notifications of detected trigger events;

Lock device state module 628 for determining a target state and current state of a lock device (e.g., smart door lock 120, FIG. 11), and for providing instructions to the lock device (e.g., if the target state and current state of the lock device are not the same);

Security profile module 630 for managing and storing respective user security profiles and settings (e.g., FIG. 13C); and Adjustment rule module 632 for creating and storing adjustment rules based on user inputs (e.g., override inputs), where in some implementations, a target state of a lock device is based on one or more created adjustment rules (e.g., used by lock device state module 628).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
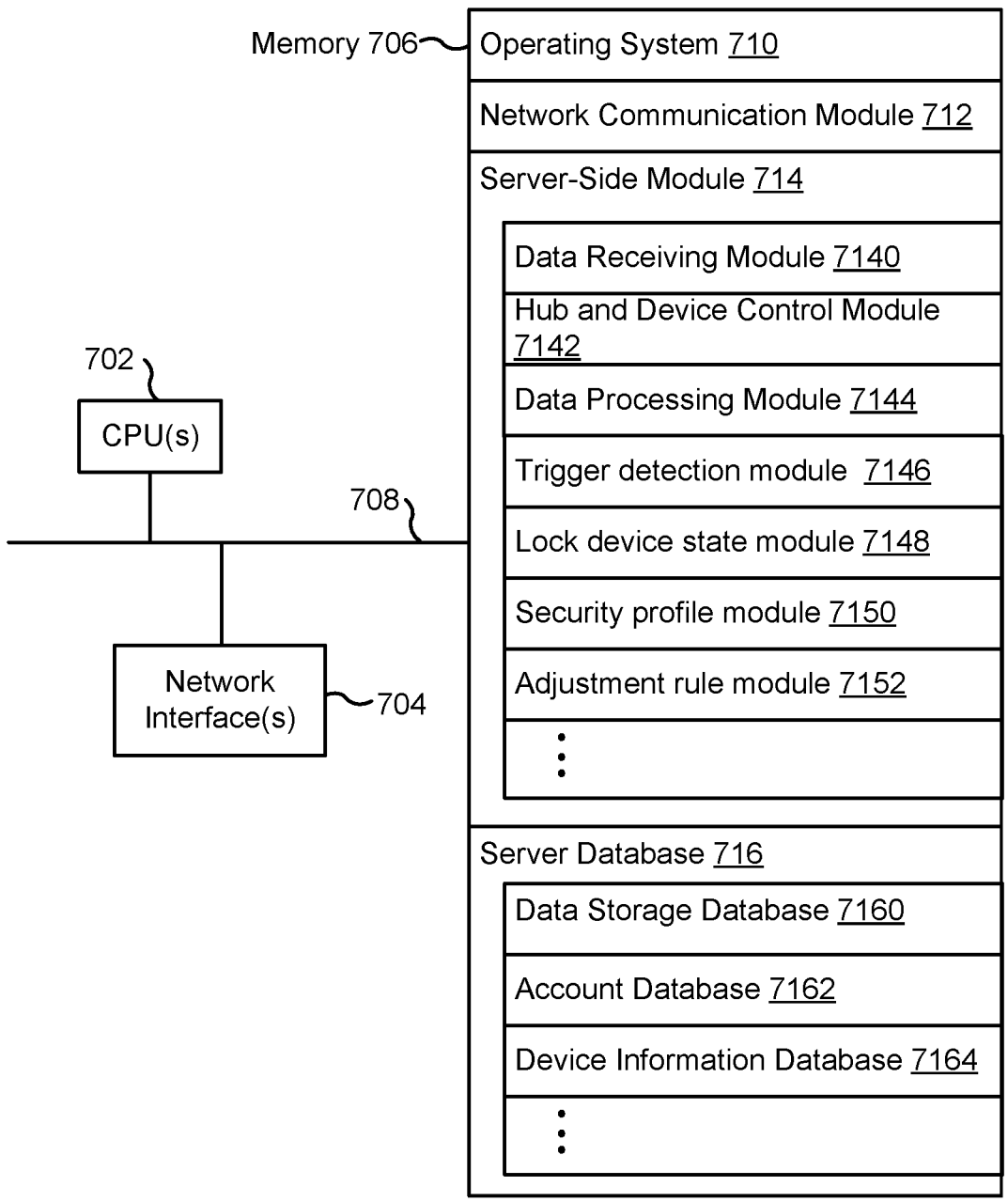
FIG. 7 is a block diagram illustrating a representative hub server system, in accordance with some implementations.

FIG. 7 is a block diagram illustrating the hub server system 508 in accordance with some implementations. The hub server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- Operating system 710 including procedures for handling various basic system services and for performing hardware dependent tasks;
- Network communication module 712 for connecting the hub server system 508 to other systems and devices (e.g., client devices, electronic devices, and systems connected to one or more networks 162, FIGS. 1-5) via one or more network interfaces 704 (wired or wireless);
- Server-side module 714, which provides server-side functionalities for device control, data processing and data review, including but not limited to:
  - Data receiving module 7140 for receiving data from electronic devices (e.g., video data from a camera 118, FIG. 1) via the hub device 180, and preparing the received data for further processing and storage in the data storage database 7160;
  - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 7144 for processing the data provided by the electronic devices, and/or preparing and sending processed data to a device for review (e.g., client devices 504 for review by a user);
  - Trigger detection module 7146 for detecting trigger events (e.g., using optional built-in sensors and inputs of the hub device 180, smart devices 204, and/or any other devices connected to the network 162) and providing notifications of detected trigger events;
  - Lock device state module 7148 for determining a target state and current state of a lock device (e.g., smart door lock 120, FIG. 11), and for providing instructions to the lock device (e.g., if the target state and current state of the lock device are not the same);
  - Security profile module 7150 for managing and storing respective user security profiles and settings (e.g., FIG. 13C); and
  - Adjustment rule module 7152 for creating and storing adjustment rules based on user inputs (e.g., override inputs), where in some implementations, a target state of a lock device is based on one or more created adjustment rules (e.g., used by lock device state module 628); and
- Server database 716, including but not limited to:
  - Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;
  - Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and
  - Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
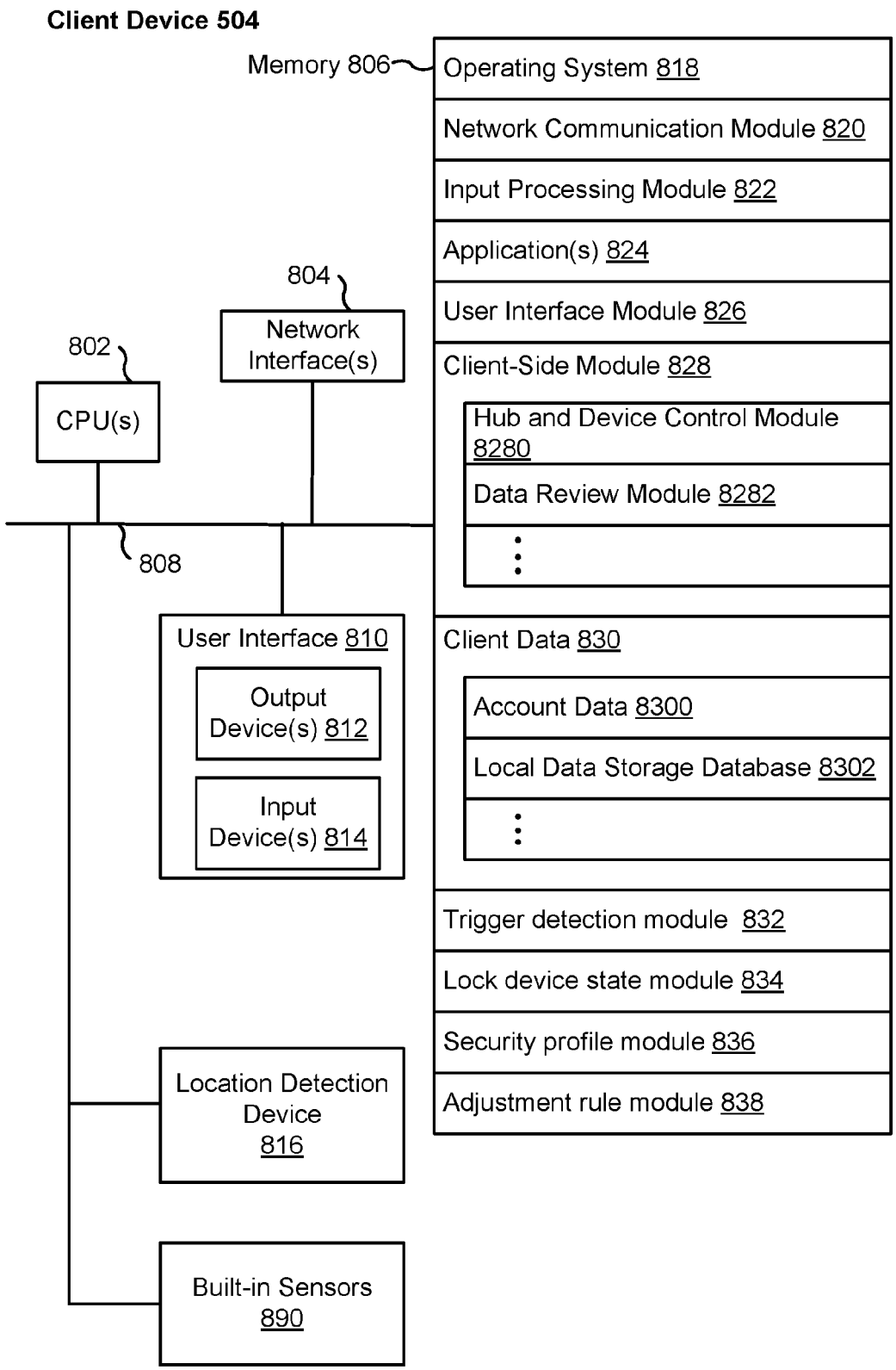
FIG. 8 is a block diagram illustrating a representative client device associated with a user account, in accordance with some implementations.

FIG. 8 is a block diagram illustrating a representative client device 504 associated with a user account in accordance with some implementations. The client device 504, typically, includes one or more processing units (CPUs) 802, one or more network interfaces 804, memory 806, and one or more communication buses 808 for interconnecting these components (sometimes called a chipset). Optionally, the client device also includes a user interface 810 and one or more built-in sensors 890 (e.g., accelerometer and gyroscope). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images (not shown). Optionally, the client device includes a location detection device 816, such as a GPS (global positioning satellite) or other geo-location receiver, for determining the location of the client device.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other systems and devices (e.g., client devices, electronic devices, and systems connected to one or more networks 162, FIGS. 1-5) via one or more network interfaces 804 (wired or wireless);

Input processing module 822 for detecting one or more user inputs or interactions from one of the one or more input devices 814 and interpreting the detected input or interaction;

One or more applications 824 for execution by the client device (e.g., games, social network applications, smart home applications, and/or other web or non-web based applications) for controlling devices (e.g., sending commands, configuring settings, etc. to hub devices and/or other client or electronic devices) and for reviewing data captured by the devices (e.g., device status and settings, captured data, or other information regarding the hub device or other connected devices);

User interface module 622 for providing and displaying a user interface in which settings, captured data, and/or other data for one or more devices (e.g., smart devices 204 in smart home environment 100) can be configured and/or viewed, for displaying notifications of trigger events (e.g., the GUI and notification 1300 of FIG. 13A), and/or for detecting user inputs (e.g., user input indicating selection of a UI element, such as an override input);

Client-side module 828, which provides client-side functionalities for device control, data processing and data review, including but not limited to:

Hub device and device control module 8280 for generating control commands for modifying an operating mode of the hub device or the electronic devices in accordance with user inputs; and Data review module 8282 for providing user interfaces for reviewing data processed by the hub server system 508; and Client data 830 storing data associated with the user account and electronic devices, including, but is not limited to:

Account data 8300 storing information related to both user accounts loaded on the client device and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc.; and Local data storage database 8302 for selectively storing raw or processed data associated with electronic devices (e.g., of the video sources 522, such as a camera 118); and Trigger detection module 832 for detecting trigger events (e.g., using optional built-in sensors and inputs of the hub device 180, smart devices 204, and/or any other devices connected to the network 162) and providing notifications of detected trigger events;

Lock device state module 834 for determining a target state and current state of a lock device (e.g., smart door lock 120, FIG. 11), and for providing instructions to the lock device (e.g., if the target state and current state of the lock device are not the same);

Security profile module 836 for managing and storing respective user security profiles and settings (e.g., FIG. 13C); and Adjustment rule module 838 for creating and storing adjustment rules based on user inputs (e.g., override inputs), where in some implementations, a target state of a lock device is based on one or more created adjustment rules (e.g., used by lock device state module 628).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
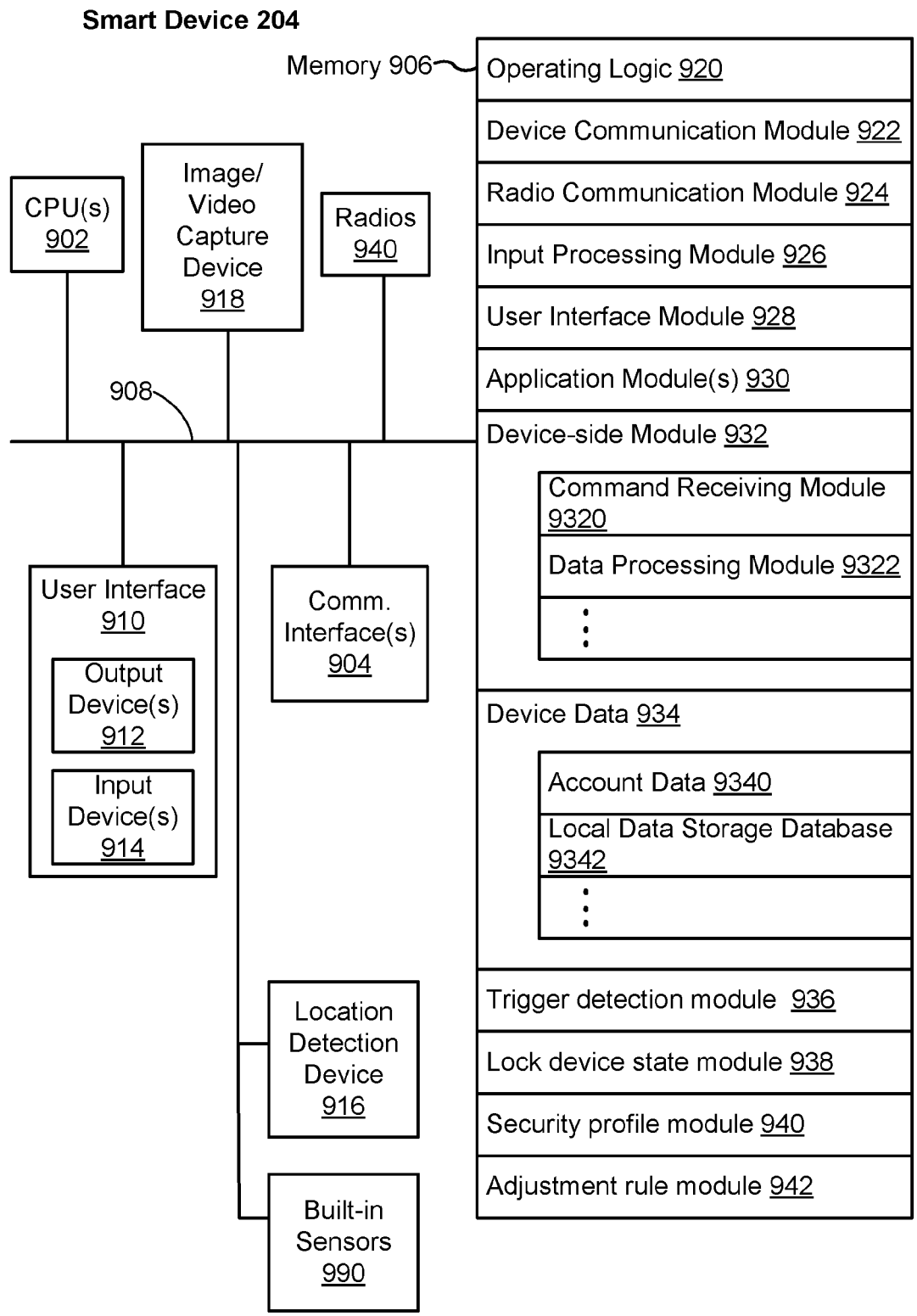
FIG. 9 is a block diagram illustrating a representative smart device, in accordance with some implementations.

FIG. 9 is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed, for displaying notifications of trigger events (e.g., the GUI and notification 1300 of FIG. 13A), and/or for detecting user inputs (e.g., user input indicating selection of a UI element, such as an override input);
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- Device-side module 932, which provides device-side functionalities for device control, data processing and data review, including but not limited to:
  - Command receiving module 9320 for receiving, forwarding, and/or executing instructions and control commands (e.g., from a client device 504, from a smart home provider server system 164, from user inputs detected on the user interface 910, etc.) for operating the smart device 204;
  - Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and
- Device data 934 storing data associated with devices (e.g., the smart device 204), including, but is not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and
  - Local data storage database 9342 for selectively storing raw or processed data associated with the smart device 204 (e.g., video surveillance footage captured by a camera 118); and
- Trigger detection module 936 for detecting trigger events (e.g., using optional built-in sensors and inputs of the hub device 180, smart devices 204, and/or any other devices connected to the network 162) and providing notifications of detected trigger events;
- Lock device state module 938 for determining a target state and current state of a lock device (e.g., smart door lock 120, FIG. 11), and for providing instructions to the lock device (e.g., if the target state and current state of the lock device are not the same);
- Security profile module 940 for managing and storing respective user security profiles and settings (e.g., FIG. 13C); and
- Adjustment rule module 942 for creating and storing adjustment rules based on user inputs (e.g., override inputs), where in some implementations, a target state of a lock device is based on one or more created adjustment rules (e.g., used by lock device state module 628).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 10:
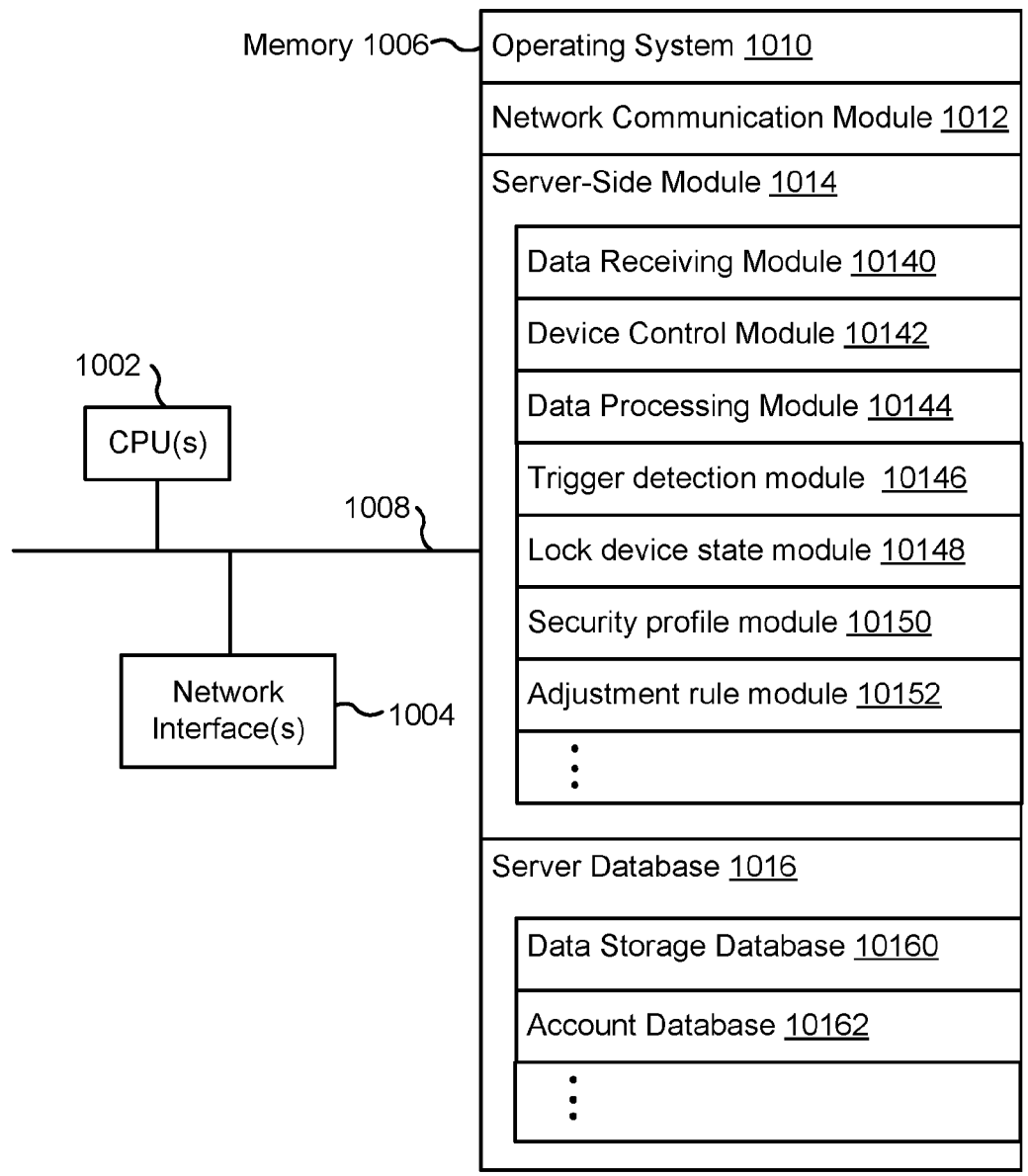
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

- Operating system 1010 including procedures for handling various basic system services and for performing hardware dependent tasks;
- Network communication module 1012 for connecting the smart home provider server system 164 to other systems and devices (e.g., client devices, electronic devices, and systems connected to one or more networks 162, FIGS. 1-5) via one or more network interfaces 1004 (wired or wireless);
- Server-side module 1014, which provides server-side functionalities for device control, data processing and data review, including but not limited to:
  - Data receiving module 10140 for receiving data from electronic devices (e.g., video data from a camera 118, FIG. 1), and preparing the received data for further processing and storage in the data storage database 10160;
  - Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 10144 for processing the data provided by the electronic devices, and/or preparing and sending processed data to a device for review (e.g., client devices 504 for review by a user);
  - Trigger detection module 10146 for detecting trigger events (e.g., using optional built-in sensors and inputs of the hub device 180, smart devices 204, and/or any other devices connected to the network 162) and providing notifications of detected trigger events;
  - Lock device state module 10148 for determining a target state and current state of a lock device (e.g., smart door lock 120, FIG. 11), and for providing instructions to the lock device (e.g., if the target state and current state of the lock device are not the same);
  - Security profile module 10150 for managing and storing respective user security profiles and settings (e.g., FIG. 13C); and
  - Adjustment rule module 10152 for creating and storing adjustment rules based on user inputs (e.g., override inputs), where in some implementations, a target state of a lock device is based on one or more created adjustment rules (e.g., used by lock device state module 628); and
- Server database 1016, including but not limited to:
  - Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and
  - Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub server system 508, client device 504, smart device 204, and/or smart home provider server system 164) are interchangeable with one another and may be performed by any other devices or systems, where the corresponding sub-modules of these functions may additionally and/or alternatively be located within and executed by any of the devices and systems. As one example, referring to FIG. 11, a smart camera 118-1, a smart doorbell 106, and/or a smart door lock 120 detect a trigger event (e.g., motion of an unverified user 1102) on the premises of the smart home environment 100, while a smart camera 118-2 and a smart hazard detector 104 detect occupancy within the premises. Furthermore, in this example, a hub device 180 determines a target state of the smart door lock 120 based on the inputs of the devices that detected occupancy and the trigger event, and provides instructions to the smart door lock 120 accordingly. The devices and systems shown in and described with respect to FIGS. 6-10 are merely illustrative, and different configurations of the modules for implementing the functions described herein are possible in various implementations.

Figure 11:
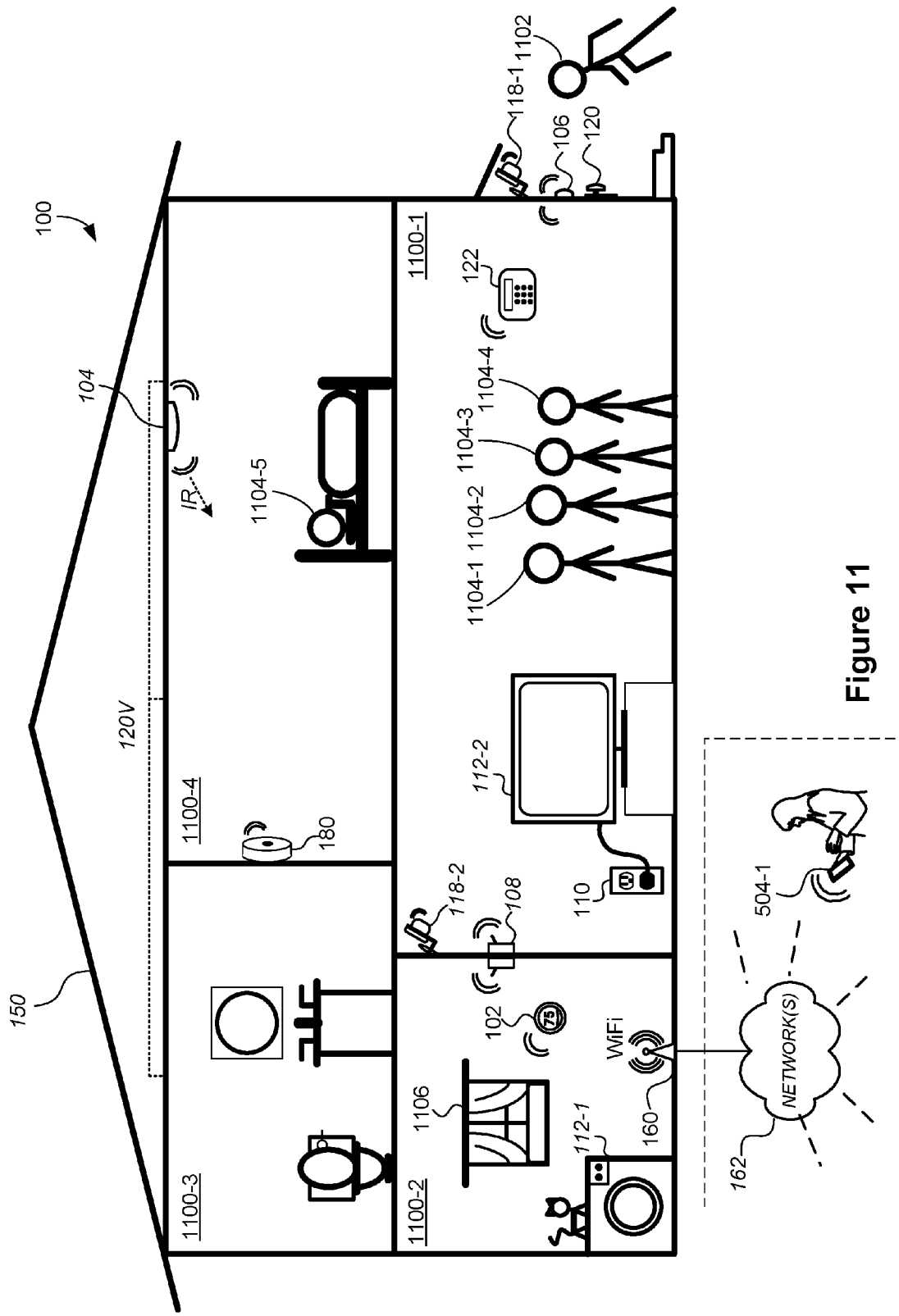
FIG. 11 is an example smart home environment, in accordance with some implementations.

FIG. 11 is an example smart home environment 100, in accordance with some implementations. In the example illustrated, the smart home environment 100 consists of a structure 150 with multiple rooms 1100 (e.g., rooms 1100-1 through 1100-4), throughout which a variety of devices (e.g., smart devices) are positioned. Devices include a smart hazard detector 104, smart appliances 112 (e.g., washing machine 112-2, television 112-2), a smart thermostat 102, smart wall switches 108, a smart wall plug 110, a hub device 180, cameras 118, a smart doorbell 106, a smart door lock 120, and a smart alarm system 122. The devices in the smart home environment 100 combine to create a mesh network through which data and instructions can be exchanged between devices, and communication with other users, devices, and systems connected to the network 162 is enabled (e.g., through a network interface 160). For example, devices in the smart home environment 100 may communicate with (e.g., provide notifications to, receive commands from) an authorized user who is not currently on the premises via a client device 504-1. The smart home environment 100 (or any combination of devices within the smart home environment 100) is sometimes referred to as a "security system." Smart home environments 100 and associated devices are described in greater detail with respect to FIG. 1. Thus, while some features of the smart home environment 100 in FIG. 11 are discussed, other features have not been so as not to obscure more pertinent aspects of the example implementation disclosed herein. Furthermore, while some example devices of the smart home environment 100 are illustrated, other implementations of the smart home environment 100 may include fewer or other additional devices.

The example illustrates a situation in which a trigger event is detected on the premises of the smart home environment 100. Trigger events are occurrences detected by one or more devices (e.g., devices in a smart home environment 100, FIGS. 1 and 11) that may or may not constitute a security breach. As some situations do not rise to the level of a security threat, it is sometimes permissible—and at times even desirable—that a door lock device retains a current locked/unlocked state until it is absolutely necessary to extend or retract the lock. This is particularly beneficial with respect to energy conservation, which is critical given that many smart lock devices are battery operated, and because actuating and retracting the bolt of a lock device consumes considerable power. Thus, by determining a target state of the lock device at a particular instance (e.g., when a trigger event is detected) and comparing the target state to a current state of the lock device, a determination can be made as to whether instructions should be sent to either actuate (i.e., lock) or retract (i.e., unlock) the bolt. As described in greater detail below, the target state of the lock device may be based on several factors, such as a current premises mode (e.g., armed/disarmed), a number of occupants detected within the premises, security profiles (i.e., profiles indicating desired target states when a respective user is detected), locations of detected users (e.g., particular room), and/or user states (e.g., asleep) of detected users. The determination of a target state based on such factors may be entirely automatic or predefined by a user.

In the example illustrated, an unverified user 1102 is detected approaching the front door of the smart home environment 100. The unverified user 1102 approaching is a trigger event that is detected by the presence detection capabilities of multiple devices positioned external to the structure 150, including the smart door lock 120, the smart doorbell 106, and the camera 118-1. Upon detecting the trigger event, one or more devices (e.g., the hub device 180) determine a target state of the lock device (e.g., smart door lock 120). In this example, assuming the threshold number of users to enable an "unlocked" state is four, the target state of the lock device will be unlocked since five users (e.g., users 1104-1 through 1104-5) are within the premises, a number determined by collecting data from several devices (e.g., the hub device 180 for detecting user 1104-5, and camera 118-2 and/or the smart alarm system 122 for detecting users 1104-1 through 1104-4). Afterwards, the determined target state of the lock device is compared against the current state of the lock device. If a discrepancy is detected (e.g., current state of the lock device is "unlocked," but the target state is "locked"), instructions are provided to the lock device based on the target state (e.g., instructions to actuate the bolt of the door lock). Thus, in situations in which the current state of the lock device already reflects the target state, commands will not be sent to the lock device. As a result, battery life is conserved and device wear is reduced.

Figure 12:
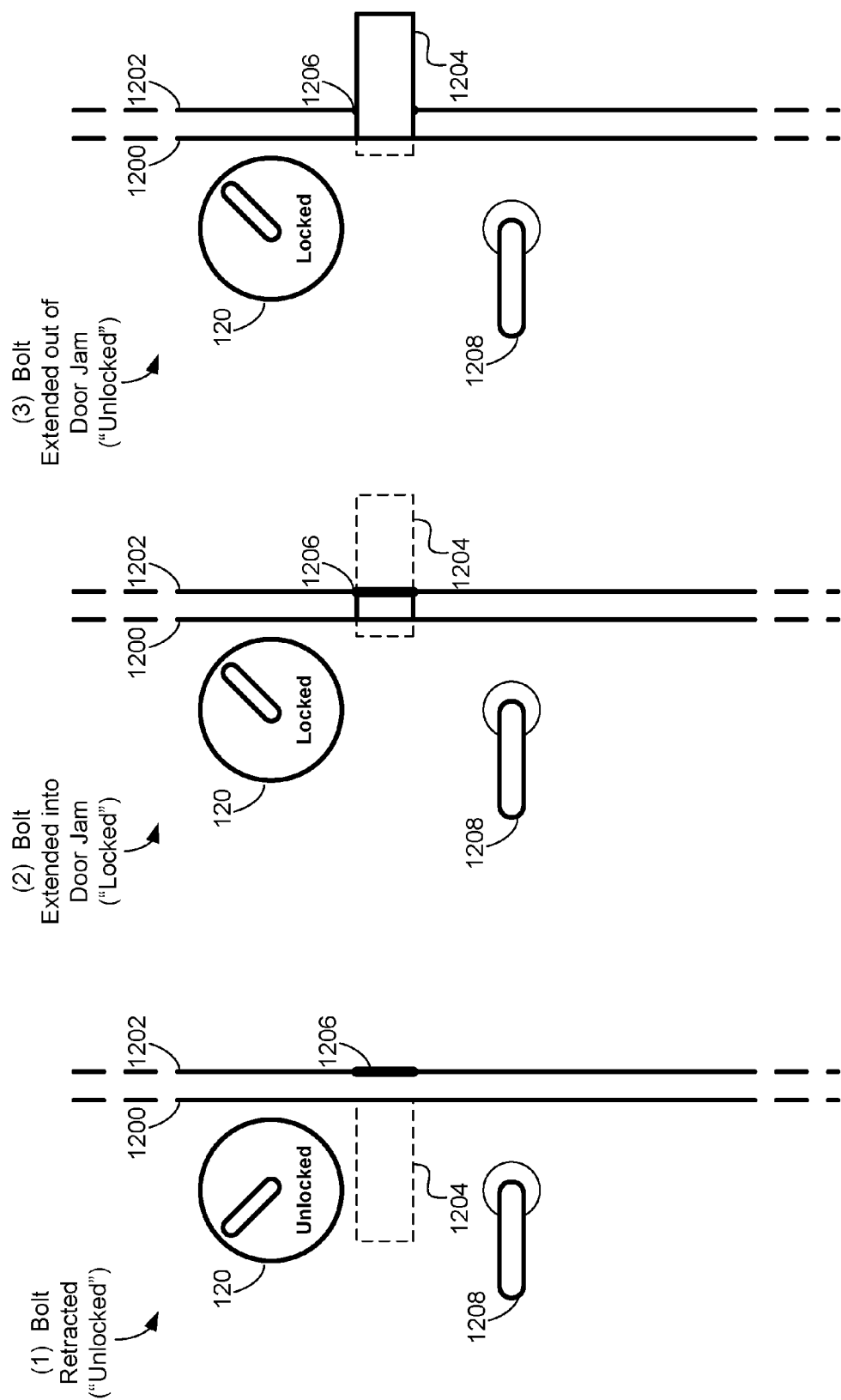
FIG. 12 illustrates various states of a lock device, in accordance with some implementations.

FIG. 12 illustrates various states of a lock device, in accordance with some implementations. Illustrated is a partial view of a door 1200 and a door frame 1202 in which the door is situated, viewed from inside a premises. Built into the door 1200 is a door handle 1208 and a smart door lock 120 (the "lock device"), which includes a bolt 1206 that can be extended ("locked") and retracted ("unlocked"). Adjacent to the door 1200 is the door frame 1202 which includes a door jamb 1206, the mechanism into which the bolt 1204 extends and creates a secure latch for locking the door 1200.

Three different states of a lock device (e.g., smart door lock 120) are illustrated, specifically states in which: (1) the bolt is retracted (a first "unlocked" state), (2) the bolt is extended into door jamb (a "locked" state), and (3) the bolt is extended out of the (a second "unlocked" state). Solely for the purposes of illustrating these various states, a visible gap is shown between the door 1200 and the door jamb 1206.

In most situations, it is inadequate for security purposes to simply identify whether the bolt of a lock device is extended or retracted. For example, when the bolt 1204 is extended out of the doorjamb, it is expected that the door is in a locked state (as indicated by the "Locked" indication on the smart door lock 120 in state (3), FIG. 12), when in fact, the door is effectively unlocked. This gives rise to a security risk that should be brought to the attention of occupants within or away from the premises, especially in situations in which the lock device should be locked (i.e., the target state of the lock device is a "locked" state) since physical intervention would be required to properly lock the door.

The door jamb 1206 and/or the bolt 1204 may include one or more passive/active components for detecting whether the bolt 1204 has partially or fully extended into the door jamb 1206. For example, the one or more passive/active components may operate jointly to form an electrical circuit, where a short circuit would indicate that the bolt 1204 has extended into the door jamb 1206, and where an open circuit would indicate that the bolt 1204 is not extended into the door jamb 1206. In some implementations, the bolt 1204 and/or the door jamb 1206 include touch-sensitive components for detecting whether the bolt 1204 is extended into the door jamb 1206.

As described in greater detail below, in some implementations, when the target state of the lock device is determined to be a locked state (i.e., state (2), FIG. 12) and it is detected that the lock device is currently in the second unlocked state (i.e., state (3)), instructions are provided to the lock device which cause the bolt to be retracted, and a notification is sent to an occupant of the premises (e.g., user 1104-1, FIG. 11).

Figure 13B:
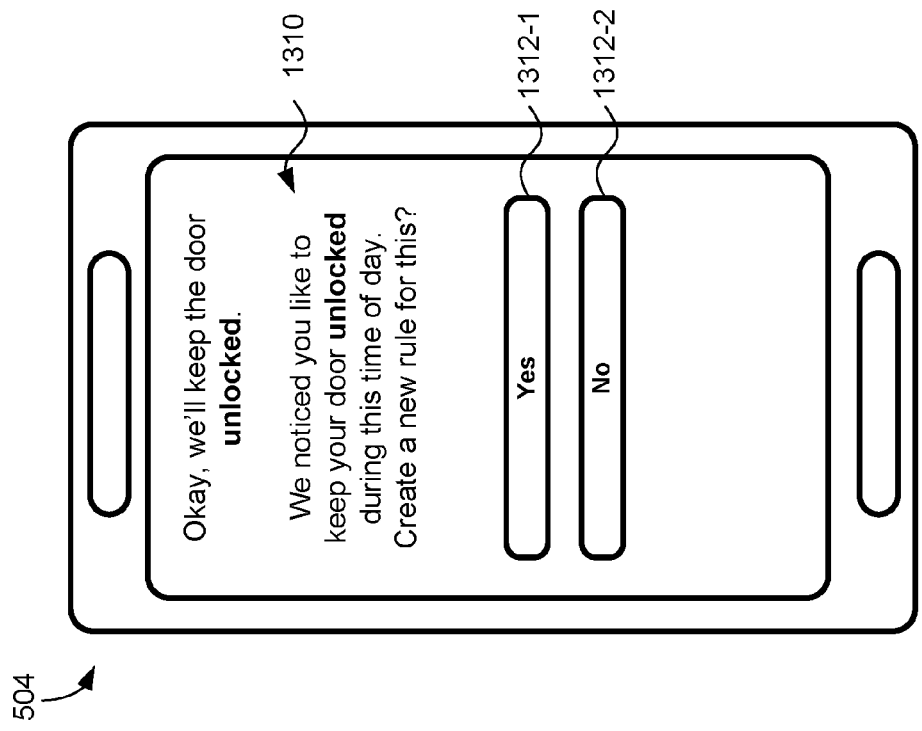
FIGS. 13A-13C illustrate examples of graphical user interfaces for displaying notifications, sending commands, and managing a security profile, in accordance with some implementations.
Figure 13A:
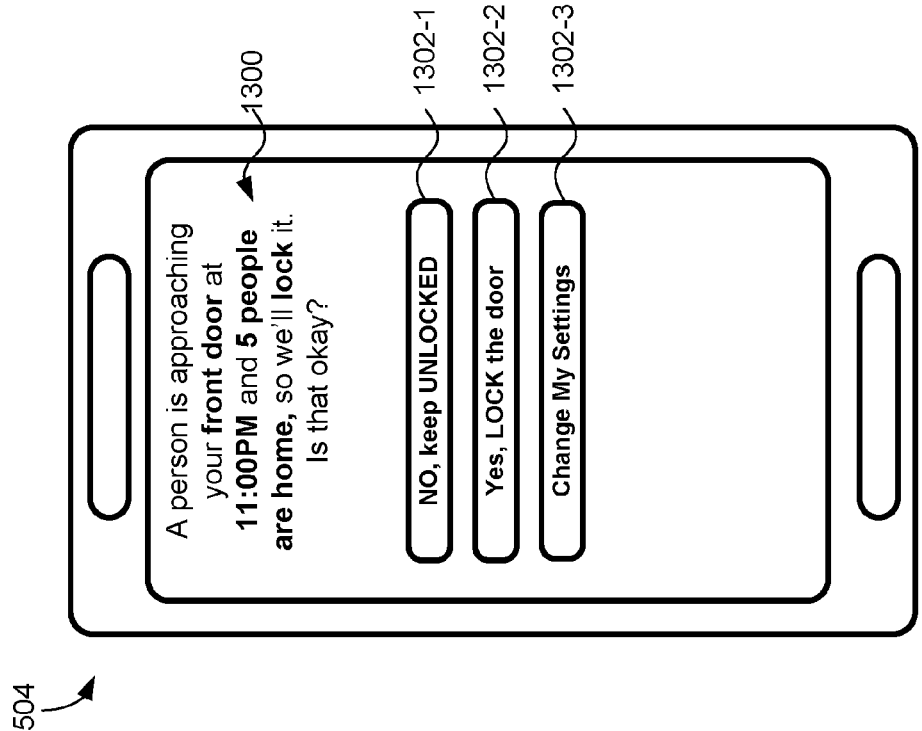
Figure 13C:
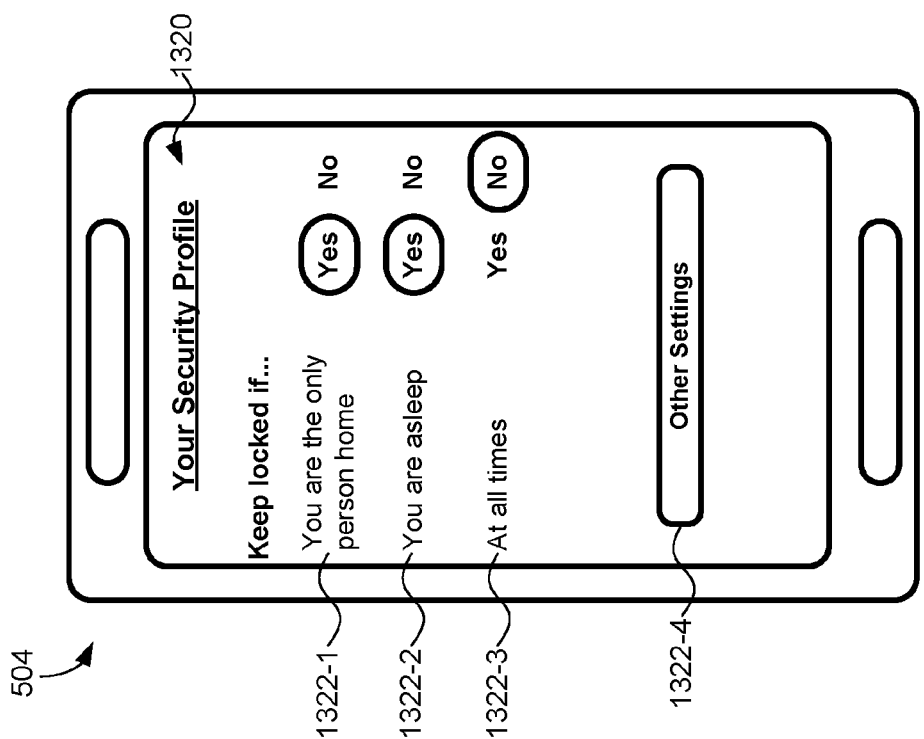

FIGS. 13A-13C illustrate examples of graphical user interfaces ("GUIs") for displaying notifications, sending commands, and managing a security profile, in accordance with some implementations. The GUIs in these figures are used to illustrate interfaces related to the processes described below, including the method 1400 (FIGS. 14A-14D). While FIGS. 13A-13C illustrate examples of GUIs, in other implementations, one or more GUIs display user-interface elements in arrangements distinct from the implementations of FIGS. 13A-13C.

The GUIs shown in FIGS. 13A-13C may be displayed on any devices (e.g., devices of the smart home environment 100 connected to network 162, FIGS. 1 and 11) having an output component (e.g., display, speaker, tactile feedback generator, etc.), such as mobile phones (e.g., client devices 504), smart devices (e.g., hub device 180, smart television 112-2, FIG. 1), or other electronic devices (e.g., personal computers, tablet computers, etc.). The GUIs may be provided by an application for managing devices of a smart home environment 100 (e.g., applications 824, FIG. 8), and/or a web browser application.

FIG. 13A illustrates a GUI for displaying a notification 1300 and for sending commands to a lock device (e.g., smart door lock 120, FIG. 11). FIG. 13A merely illustrates one implementation of the method 1400 in which a user may receive notifications and provide commands through a GUI. In some implementations, however, at least some steps of the method 1400 are automated and do not require user interaction (e.g., do not require authorization to lock/unlock a lock device in response to detecting a trigger event).

Referring to the example of FIG. 11, the notification 1300 in FIG. 13A indicates that a trigger event has been detected at a smart home environment 100 associated with the authorized user of the client device 504. In this example, the notification 1300 indicates the particular area and time at which the trigger event was detected (e.g., front door, 11:00 PM), the type of trigger event (e.g., motion detected within proximity), the number of detected occupants (e.g., 5), the target state of the lock device (e.g., "unlocked"), and the current state of the lock device (e.g., "unlocked"). In this example, the threshold number of occupants for maintaining an unlocked target state of the lock device is four occupants. Thus, because five occupants (e.g., users 1104-1 through 1104-5, FIG. 11) are detected, the target state of the lock device (e.g., smart door lock 120) is an "unlocked" state. Consequently, because the current state of the lock device is also an "unlocked" state, the notification requests confirmation from the user to maintain the unlocked state.

Various user-interface ("UI") elements (e.g., 1302-1 to 1302-3) are displayed, corresponding to various operations and commands that an authorized user may choose to execute in response to the notification 1300. The user may choose to: keep the door unlocked (1302-1), lock the door (1302-2), or change the settings of his security profile (1302-3).

FIG. 13B illustrates a GUI that is displayed in response to the authorized user requesting to keep the lock device unlocked (e.g., command to keep the lock device unlocked, 1302-1, FIG. 13A). Additionally, because the user provided an override input negating instructions corresponding to the target state of the lock device (e.g., command to keep the lock device unlocked, rather than lock the lock device), the GUI optionally prompts the user to create an adjustment rule based on the override input. In this example, the GUI indicates that the user has regularly provided an override input in response to trigger events detected at that particular time of day, suggesting the possibility that the determined target state of the lock device was not properly determined. In some implementations, if the user chooses to create an adjustment rule (1312-1), the target state of the lock device determined in response to a subsequent trigger event under similar circumstances (e.g., same time of day, type of trigger event, number of occupants within the premises, etc.) will be set to an unlocked state, rather than a locked state. Alternatively, by foregoing the creation of a new adjustment rule (1312-2), the target state of the lock device will continue to be a locked state in response to subsequent trigger events under similar circumstances. Adjustment rules are described in greater detail with respect to the method 1400 (FIGS. 14A-14D).

FIG. 13C illustrates a GUI that is displayed in response to the authorized user requesting to change the settings of his security profile (e.g., command to lock the lock device, 1302-3, FIG. 13A). A user may configure his respective security profile to dictate under what conditions the target state of the lock device will be locked/unlocked when the user is within or away from the premises.

The GUI illustrates various examples of such settings that be configured for a security profile (1320). For example, a user may keep the door locked if the user is the only occupant within the premises (1322-1), if the user is asleep (1322-2), or at all times (1322-3). Optionally, the user may configure other settings related to security profiles (1322-4). Security profiles are described in greater detail with respect to FIGS. 14A-14D.

FIGS. 13A-13C illustrate only examples of GUIs that may be displayed in performing the method 1400 described below (FIGS. 14A-14D). It is noted, however, that additional and/or alternative GUIs may be displayed, including UI elements corresponding to alternative and/or additional commands or operations that may be executed.

FIGS. 14A-14D are flow diagrams illustrating a method of automatically determining a target state of a lock device in response to detecting a trigger event, in accordance with some implementations. In some implementations, the method 1400 is performed by one or more electronic devices of one or more systems (e.g., devices of a smart home environment 100, FIGS. 1 and 11; devices 204 and/or hub device 180 of smart home network 202, FIG. 2) and/or a server system (e.g., smart home provider server system 164 of FIGS. 1 and 2, hub server system 508 of FIG. 5). Thus, in some implementations, the operations of the method 1400 described herein are entirely interchangeable, and respective operations of the method 1400 are performed by any of the aforementioned devices, systems, or combination of devices and/or systems. For ease of reference, the methods herein will be described as being performed by an electronic device (e.g., hub device 180, FIG. 11) associated with a lock device (e.g., smart door lock 120). In some implementations, the electronic device is the lock device (e.g., smart door lock 120). FIGS. 14A-14D correspond to instructions stored in a computer memory or other computer-readable storage medium (e.g., memory 606 of the hub device 180).

The electronic device obtains (1402) a number of users detected within a premises. Referring to the example of FIG. 11, five users (e.g., users 1104-1 through 1104-5) are detected within the smart home environment 100. Furthermore, the electronic device detects (1404) a trigger event related to a lock device (e.g., smart door lock 120, FIG. 11) and the premises. As noted above, trigger events are occurrences detected by one or more devices (e.g., devices in a smart home environment 100, FIGS. 1 and 11) that may or may not constitute a security breach. Premises upon which a trigger event may be detected include a perimeter established by the smart home environment 100 (e.g., in a room 1100, on the front yard outside of the structure 150, on a porch of the structure 150, etc.), or by multiple smart home environments 100 (e.g., within a geo-fence perimeter established by multiple smart devices across multiple smart home environments 100 within a neighborhood). Trigger events may include detection of motion around or within the premises, such as detecting motion within a predefined range of a structure (e.g., within 20 feet of the structure 150, within a 100-foot radius of the center of the structure 150)

or in a specified area of the premises (e.g., front lawn, back yard, a room 1100, etc.). Trigger events may also include detecting an applied force on the premises (e.g., touch detected on the structure 150, touch detected on a door handle coupled to the smart door lock 120, etc.). In some implementations, trigger events include attempted openings of entryways (e.g., window, front door, garage). In some implementations, detecting (1404) the trigger event includes detecting (1406) that an unverified user entered the premises (e.g., the smart home environment 100 in FIG. 11, including an area surrounding the structure 150). In some implementations, detecting the trigger event includes detecting that an unverified user is approaching or attempting to enter the premises (i.e., detecting that a user is approaching, rather than breaching, a perimeter of the premises). In some implementations, trigger events are detected by one or more sensing capabilities of a device (or a group of devices) in the smart home environment 100. For example, referring to FIG. 11, the unverified user 1102 approaching the door is a trigger event that is detected based on data gathered from the camera 118-1, the smart doorbell 106, and/or the smart door lock 120.

In some implementations, the lock device includes (1408) a bolt (e.g., smart door lock 120 that includes a bolt 1204, FIG. 12). The state of the lock device is: a locked state (1410), wherein the bolt of the lock device is extended into a door jamb (e.g., state (2), FIG. 12); a first unlocked state (1412), wherein the bolt of the lock device is retracted (e.g., state (1), FIG. 12); or a second unlocked state (1414), wherein the bolt of the lock device is extended, but not into the door jamb (e.g., state (3), FIG. 12).

Optionally, in implementations in which an unverified user is detected (step 1406), the electronic device determines (1416) whether the unverified user is an authorized user. In some implementations, whether the unverified user is an authorized user is determined via user input received on an interactive touch-screen device (e.g., selection of a response on the touch-screen of the hub device 180), a biometric sample (e.g., fingerprint, retinal scan), user credentials (e.g., username and password, PIN), detection of an authenticated RFID device (e.g., RFID tag), wireless pairing of an authenticated device (e.g., Wi-Fi, IR, Bluetooth, key fob), and/or any other personal identification means known to those skilled in the art.

When the trigger event is detected (1404), the electronic device determines (1418) a target state of the lock device. The target state is a state of the lock device (e.g., locked/unlocked) that is desirable based on circumstantial information surrounding a trigger event (e.g., data gathered by devices within a smart home environment 100), pre-configured user settings (e.g., defined by a security profile), behavioral user information, and/or other information known or unknown to a user. In other words, the target state reflects whether the user—given available circumstantial information surrounding a trigger event—would want the lock device to be unlocked or locked. Furthermore, as described in greater detail below, a current state of the lock device is determined (1460, FIG. 14D), and if the current state and the target state of the lock device are not the same, instructions are provided (1462, FIG. 14D) to the lock device based on the target state.

The target state of the lock device is determined based on (1420) at least one or a combination of factors. A non-exhaustive discussion of such factors and signals is described with respect to FIG. 14B, with examples of determined target states being described with respect to FIG. 14C (target state is a locked state, 1438) and FIG. 14D (target state is an unlocked state, 1452). Moreover, in some implementations, the target state of the lock device may be based on additional factors or signals that utilize the sensory and data processing capabilities of devices described herein (e.g., devices of a smart home environment 100, FIGS. 1 and 11). Additional examples include hazard signals (e.g., alerts regarding carbon monoxide levels), personal details of occupants detected within the premises (e.g., user IDs, age, gender, relationship to other occupants/home owner, community status, etc.), environmental conditions (e.g., local state of emergency, extreme weather, etc.), or other signals and/or information indicative of a risk associated with an unlocked/locked state of the lock device.

In some implementations, the target state of the lock device is determined based on the obtained number of users (1422) detected within the premises. In some implementations, the target state of the lock device is an unlocked state if the number of users detected within the premises satisfies a predefined threshold (1454, FIG. 14D). For example, in FIG. 11, if the predefined threshold of detected occupants within the premises is four, the target state of the smart door lock 120 is an unlocked state since five occupants are detected (e.g., users 1104-1 through 1104-5).

In some implementations, if one or more users are detected within the premises, the target state of the lock device is determined based on respective security profiles (1424) of the one or more detected users, wherein a respective security profile of a respective user indicates a desired target state of the lock device when the respective user is within the premises. Security profile are configurable by each individual to dictate a desired target state (e.g., locked/unlocked) of a lock device when the user is at home or away. An example of various conditions that may be configured for a security profile is provided in FIG. 13C. In some implementations, security profiles indicate a type of a respective user, where the target state of the lock device is based on the type of the respective user (e.g., security profiles for children indicate that the lock device should be in a locked state at all times). In some implementations, the security profile of a respective user, of one or more detected users, indicates (1444, FIG. 14C) that the desired target state of the lock device is the locked state when the respective user is within the premises (e.g., while user 1104-1 detected within the smart home environment, target state of the smart door lock 120 is a locked state, FIG. 11). Security profiles may indicate the desired lock state based on a user state (e.g., awake, asleep, engaged in a particular activity). In some implementations, security profiles are specified with respect to time, such as a particular time of day (e.g., target state is unlocked during Monday mornings), or a threshold duration of time for which a respective user is detected within the premises (e.g., after a user is detected within the premises for more than an hour, target state is locked).

In some implementations, when a plurality of users with security profiles are detected within the premises, the target state of the lock device is based on the security profile with the most stringent requirements (e.g., the target state is a locked state if the security profile of any detected user indicates that the target state is locked at all times). In some implementations, user security profiles have a respective priority, where the target state of the lock device is determined based on the security profile with the highest priority.

In some implementations, if one or more users are detected within the premises, the target state of the lock device is determined based on a location (1426) of the one or more detected users. Locations may be a general region of a premises (e.g., front lawn of the smart home environment 100, FIG. 11) or a particular room (e.g., room 1100-1). In some implementations, the target state of the lock device is a locked state if the current location of a respective user, of one or more detected users, indicates (1438, FIG. 14C) that the respective user is located within a predefined area of the premises. For example, an authorized user may specify that the target state should be a locked state if a trigger event is detected while the user is in a specified room (e.g., a bathroom, such as the room 1100-3, FIG. 11). In some implementations, the target state of the lock device is based on a distance between a detected location of a user and the location of the detected trigger event (e.g., the front door of the premises, FIG. 11) satisfies a predefined threshold (e.g., target state is a locked state if distance is more than 100 feet away). In some implementations, the target state of the lock device is based on the average distance of all users and the location of the trigger event is determined, and whether the average distance satisfied a predefined threshold.

In some implementations, if one or more users are detected within the premises, the target state of the lock device is determined based on a user state (1428) of the one or more detected users, wherein a respective user state of a respective user indicates that the respective user is asleep or active. In some implementations, the target state of the lock device is a locked state if the user state of a respective user, of one or more detected users, indicates (1442, FIG. 14C) that the respective user is asleep. Additionally and/or alternatively, the user state indicates a particular activity in which a respective user is engaged (e.g., target state is locked state if user is gardening, cooking, watching television, etc.).

In some implementations, the target state of the lock device is determined based on a current premises mode (1430), including an armed state and a disarmed state. In some implementations, the premises mode is set manually by the user (e.g., user arms the smart alarm system 122 upon leaving the premises, FIG. 11), or automatically (e.g., when smart home environment 100 detects that a user leaves the premises). In some implementations, the target state of the lock device is a locked state if the current premises mode is a first armed state (1448, FIG. 14C) (e.g., an "Away" mode of a smart alarm system 122, FIG. 11), indicating that no authorized users are currently within the premises. In some implementations, the target state of the lock device is a locked state if the current premises mode is a second armed state (1450, FIG. 14C) (e.g., a "Home+Armed" mode of a smart alarm system 122, used for arming a smart home environment 100 if a user is within the premises, but asleep), indicating that at least one authorized user is currently within the premises and that the lock device is configured to be in the locked state. In some implementations, the target state of the lock device is an unlocked state if the current premises mode is a disarmed state (1458, FIG. 14D) (e.g., a "Home" mode of a smart alarm system 122, FIG. 11), indicating that one authorized user is currently within the premises and that the lock device is configured to be in the unlocked state.

In some implementations, the target state of the lock device is determined based on the determination (1432) of whether the unverified user is an authorized user. In some implementations, the target state of the lock device is an unlocked state if the unverified user is (1456, FIG. 14D) an authorized user. For example, the unverified user 1102 in FIG. 11 is determined to be authorized based on detection of an authorized key fob.

In some implementations, the target state of the lock device is determined based on the trigger event (1434). For example, the smart home environment 100 (FIG. 11) may be configured such that the target state of the lock device remains unlocked if movement is detected around the window 1106 (room 1100-2), so as to exclude expected movement of domestic animals from triggering a locked state.

In some implementations, determining the target state includes (1436) obtaining one or more inputs from one or more devices distinct from the electronic device and the lock device. For example, referring to FIG. 11, the number of users within the premises is detected (1402) by retrieving data from the smart hazard detector 104 and/or the hub device 180 in room 1100-4 (for detecting user 1104-5), and by the smart alarm system 122, smart wall plug 110, smart wall switch 108, and/or camera 118-2 in room 1100-1 (for detecting users 1104-1 through 1104-4).

In some implementations, the factors upon which the target state of the lock device is based (described above with respect to FIG. 14B) have respective weights, wherein the target state of the lock device is determined based on the respective weights. Thus, in some implementations, factors having greater respective weights take precedence over other factors with lesser respective weights with respect to determining the target state of the lock device. As an example, if the current premises mode (1430) has a greater respective weight than the weight associated with the number of users detected within the premises (1422), if the current premises mode is determined to be the second armed state (1450, FIG. 14C, a "Home+Armed" mode where the target state is a locked state, for example), the target state of the lock device will be a locked state regardless of how many users are detected on the premises.

Figure 14A:
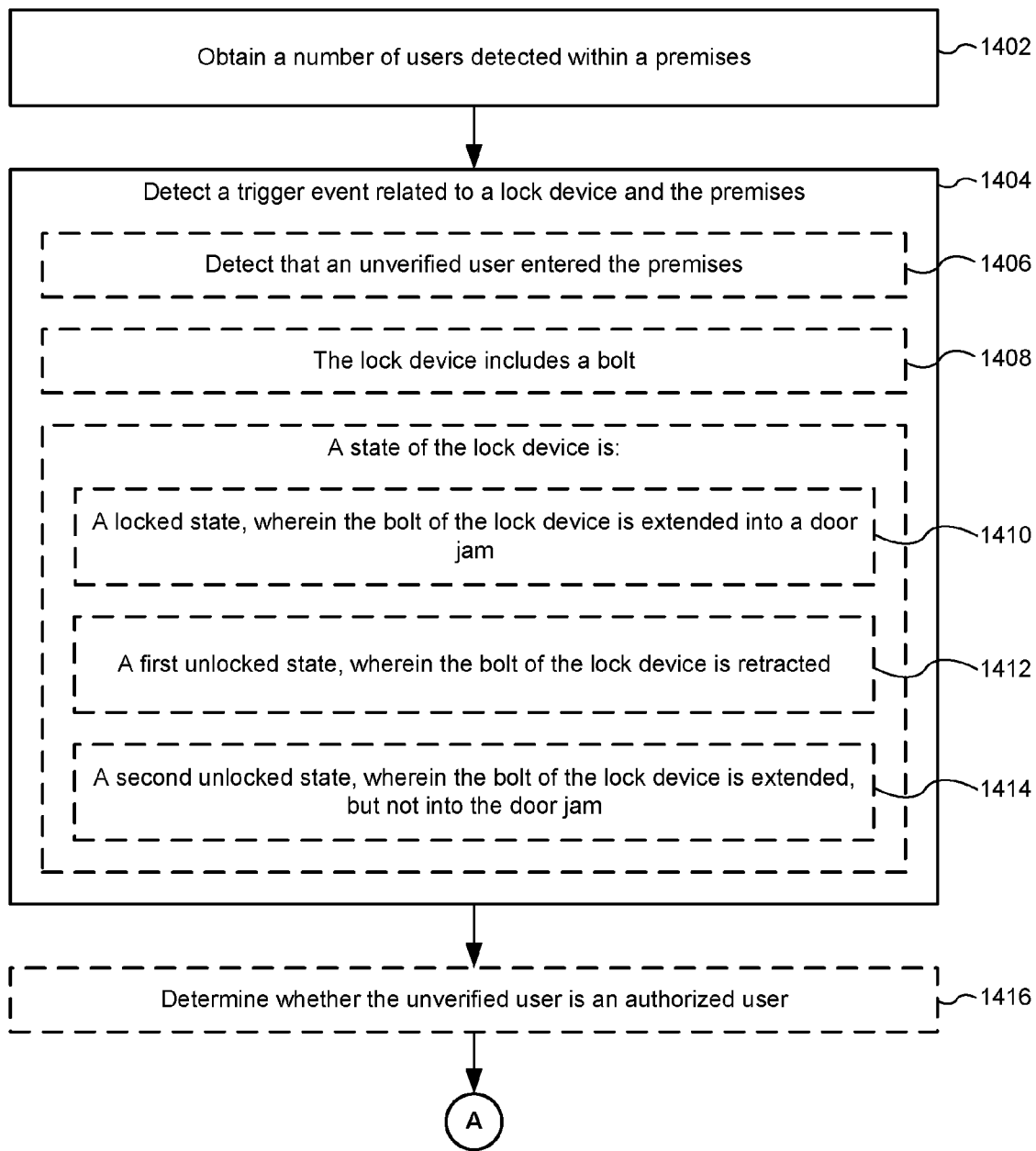
FIGS. 14A-14D are flow diagrams illustrating a method of automatically determining a target state of a lock device in response to detecting a trigger event, in accordance with some implementations.
Figure 14B:
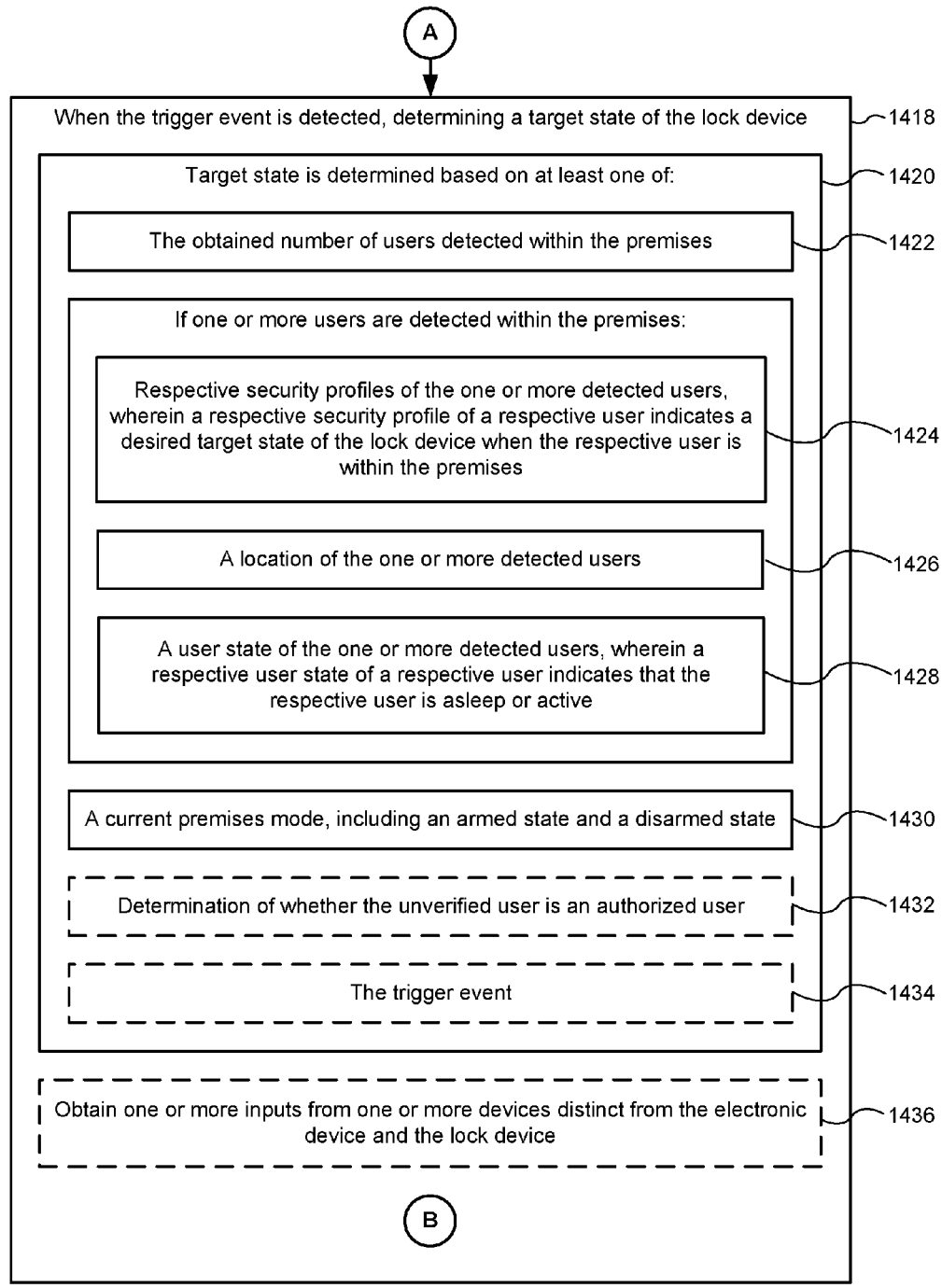
Figure 14C:
Figure 14D:
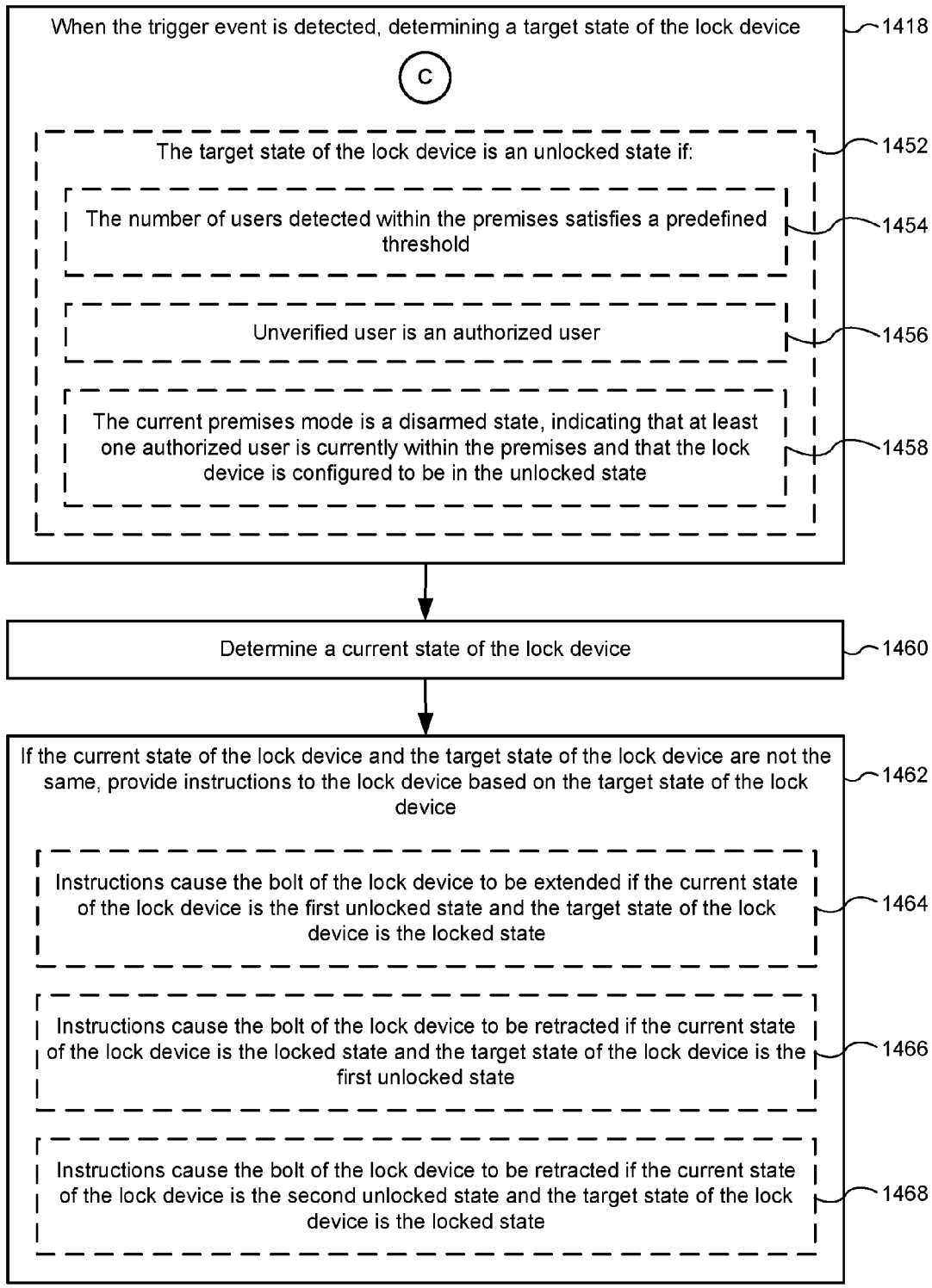

Referring to FIG. 14D, the electronic device determines (1460) a current state of the lock device. In some implementations, the current state of the lock device is a locked state (1410, FIG. 14A), a first unlocked state (1412, FIG. 14A) (i.e., bolt retracted), or a second unlocked state (1414, FIG. 14A) (i.e., bolt extended, but not into door jamb). In some implementations, the current state of the lock device is an unlocked state (e.g., default state of the lock device is unlocked, and lock device is only locked when necessary).

If the current state (determined at 1460) of the lock device and the target state (determined at 1418, FIGS. 14B-14D) of the lock device are not the same, instructions are provided (1462) to the lock device based on the target state of the lock device. In doing so, the lock device is operated (e.g., extending/retracting the bolt) and power is consumed only if necessary, based on the determined target state of the lock device. In some implementations, the instructions cause (1464) the bolt of the lock device to be extended if the current state of the lock device is the first unlocked state and the target state of the lock device is the locked state (i.e., the lock device is currently unlocked and should be locked). In some implementations, the instructions cause (1466) the bolt of the lock device to be retracted if the current state of the lock device is the locked state and the target state of the lock device is the first unlocked state (i.e., the lock device is currently locked and should be unlocked). In some implementations, the instructions cause (1468) the bolt of the lock device to be retracted if the current state of the lock device is the second unlocked state and the target state of the lock device is the locked state (i.e., the lock device is currently in a faulty lock position (e.g., bolt extended, but not into the door jamb) and should be locked, so bolt is first retracted). Optionally, a notification regarding the current state of the lock device (e.g., the second unlocked state) is sent to one or more users so that the lock device may be properly secured.

In some implementations, if the current state of the lock device and the target state of the lock device are not the same, prior to providing the instructions to the lock device (1462), a notification is provided indicating that the current state and the target state are not the same. Subsequently, an override input is received (e.g., if instructions are based on a locked target state, the override input corresponds to an unlocked target state), wherein the instructions provided to the lock device are further based on the override input (e.g., instructions to maintain current state of lock device). Prior to engaging the target state of the lock device, a user is therefore given the opportunity to decide whether the automatically determined target state is desirable, and may send an override command to toggle the target state. An example GUI for providing a notification (e.g., notification 1300) and for receiving an override input (e.g., 1302-1, for toggling the target state from locked to unlocked) is illustrated in and described with respect to FIG. 13A. Additionally and/or alternatively, an override input includes the manual extension or retraction of a bolt of the lock device by a user (e.g., toggling the latch of a smart door lock 120, FIG. 12). In some implementations, the notification is provided and the override input is received after the instructions (based on the target state of the lock device) have been provided to the lock device. In some implementations, a notification is provided indicating that the current state and the target state of the lock device are the same, and the override input is received in response to the notification (e.g., to toggle target state from unlocked to locked, or locked to unlocked).

In some implementations, after receiving an override input, an adjustment rule is created in accordance with the override input. After creating the adjustment rule, when a subsequent trigger event is detected, a subsequent target state of the lock device is determined based on at least the adjustment rule. An example is illustrated in FIGS. 13A and 13B. Here, the user provided an override input for keeping the lock device unlocked (1302-1). As the notification in FIG. 13B indicates, the user is prompted with a request to create an adjustment rule based on the user's observed pattern for keeping the lock device unlocked during the particular time of day at which the trigger event was detected (e.g., 11:00 PM, FIG. 13A). Accordingly, if the user chooses to create an adjustment rule, the target state of the lock device determined for subsequent trigger events of the same or similar nature (e.g., movement detected at the front door around 11:00 PM) will be based on the adjustment rule (e.g., the target state will be an unlocked state, as opposed to a locked state). Adjustment rules therefore dynamically track and adapt to user behavior, and allow for the calibration and refinement of algorithms used for determining the target state of the lock device. In some implementations, machine learning techniques known to those skilled in the art are used for automatically creating the adjustment rules. In some implementations, the adjustment rule includes details with respect to the parameters upon which the initial target state was determined (e.g., the initial target state, determined prior to creating the adjustment rule, was based on a threshold of five users detected within the premises). In some implementations, the adjustment rule is created when a threshold number of override inputs has been received with respect to a plurality of trigger events having similar corresponding circumstances (e.g., override inputs are received for five separate trigger events in which motion was detected at the front door at 11:00 PM while five occupants were detected within the premises). In some implementations, the adjustment rule is created when an override input is received within a predefined window of time after instructions based on the target state are provided, so as to avoid tracking of lock state toggles that do not suggest that the target state was inaccurately determined (e.g., only lock toggles occurring within 1 minute after instructions are provided to the lock device are considered override inputs with respect to creating an adjustment rule).

As stated above, operations of the method 1400 described herein are entirely interchangeable and may be performed by different devices or the same device. For example, a smart device in the vicinity having a greater number of interconnections with nearby smart devices, more processing power, Internet connectivity, and a persistent power source (e.g., a hub device 180) may be better suited for determining a target state of the lock device. In other implementations, given the limited storage space of some smart devices, it may be preferable that a remote server system (e.g., smart home provider server system 164) stores and determines appropriate target states of the lock device. In other implementations, however, the lock device itself manages its own state without requiring the additional processing power and storage capabilities of other devices. In some implementations, a determination of where and by which devices operations are performed is based on current or changing environmental conditions (e.g., in the event of a power outage, the task of determining the target lock state is delegated to the lock device, assuming it is battery-operated).

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of operating a battery-powered lock device, the method comprising:

at an electronic device having one or more processors and memory for storing instructions for execution by the one or more processors, wherein the electronic device is associated with a smart home environment that includes the battery-powered lock device:
detecting a trigger event related to security of the smart home environment;
determining, based on the trigger event, a target state of the lock device;
determining a current state of the lock device;
comparing the target state of the lock device with the current state of the lock device;
sending a notification to a user device, the notification including an indication of the trigger event and a prompt for an override input; and
providing or foregoing provision of instructions to operate the lock device based on (i) the result of the comparison, and (ii) a received override input or lack thereof.

2. The method of claim 1, wherein the instructions to operate the lock device comprise instructions to extend or retract a bolt of the lock device, thereby conserving battery power when foregoing provision of the instructions to operate the lock device.

3. The method of claim 1, further comprising:
receiving an override input prior to providing or foregoing provision of the instructions to operate the lock device;
wherein providing or foregoing provision of the instructions to operate the lock device is based on the received override input.

4. The method of claim 1, further comprising:
receiving an override input subsequent to providing or foregoing provision of the instructions to operate the lock device; and
providing further instructions to operate the lock device in accordance with the subsequently received override input.

5. The method of claim 1, further comprising:
receiving an override input; and
creating an adjustment rule in accordance with the received override input.

6. The method of claim 5, wherein the adjustment rule is configured to adjust one or more security settings stored in a database associated with the smart home environment, wherein the one or more security settings serve as a basis for determining, based on the trigger event, the target state of the lock device.

7. The method of claim 5, further comprising:
detecting a subsequent trigger event related to security of the smart home environment; and
determining, based on the subsequent trigger event and the adjustment rule, a subsequent target state of the lock device.

8. The method of claim 5, wherein the adjustment rule is created in response to receiving a threshold number of override inputs with respect to a plurality of trigger events having similar circumstances.

9. The method of claim 5, wherein the adjustment rule is created in response to receiving the override input within a predefined window of time after providing the instructions to operate the lock device.

10. An electronic device associated with a battery-powered lock device, the electronic device comprising:
a processor; and
memory for storing one or more programs for execution by the processor, the one or more programs including instructions for:
detecting a trigger event related to security of a smart home environment;
determining, based on the trigger event, a target state of the lock device, the lock device being associated with the smart home environment;
determining a current state of the lock device;
comparing the target state of the lock device with the current state of the lock device;
sending a notification to a user device, the notification including an indication of the trigger event and a prompt for an override input; and
providing or foregoing provision of instructions to operate the lock device based on (i) the result of the comparison, and (ii) a received override input or lack thereof.

11. The electronic device of claim 10, wherein the instructions to operate the lock device comprise instructions to extend or retract a bolt of the lock device, thereby conserving battery power when foregoing provision of the instructions to operate the lock device.

12. The electronic device of claim 10, wherein the one or more programs further include instructions for:
receiving an override input prior to providing or foregoing provision of the instructions to operate the lock device;
wherein providing or foregoing provision of the instructions to operate the lock device is based on the received override input.

13. The electronic device of claim 10, wherein the one or more programs further include instructions for:
receiving an override input subsequent to providing or foregoing provision of the instructions to operate the lock device; and
providing further instructions to operate the lock device in accordance with the subsequently received override input.

14. The electronic device of claim 10, wherein the one or more programs further include instructions for:
receiving an override input; and
creating an adjustment rule in accordance with the received override input, wherein the adjustment rule is configured to adjust one or more security settings stored in a database associated with the smart home environment, wherein the one or more security settings serve as a basis for determining, based on the trigger event, the target state of the lock device.

15. The electronic device of claim 14, wherein the one or more programs further include instructions for:
detecting a subsequent trigger event related to security of the smart home environment; and
determining, based on the subsequent trigger event and the adjustment rule, a subsequent target state of the lock device.

16. The electronic device of claim 14, wherein the adjustment rule is created in response to:
receiving a threshold number of override inputs with respect to a plurality of trigger events having similar circumstances; or
receiving the override input within a predefined window of time after providing the instructions to operate the lock device.

17. A non-transitory computer readable storage medium, storing one or more programs for execution by one or more processors, the one or more programs including instructions for:
detecting a trigger event related to security of a smart home environment;
determining, based on the trigger event, a target state of a lock device associated with the smart home environment;
determining a current state of the lock device;

comparing the target state of the lock device to the current state of the lock device; and sending a notification to a user device, the notification including an indication of the trigger event and a prompt for an override input;

in accordance with a determination that the current state is equivalent to the target state, retaining the current state of the lock device by foregoing provision of instructions to operate the lock device unless an override input is received from the user device; and in accordance with a determination that the current state is not equivalent to the target state, providing instructions to operate the lock device unless an override input is received from the user device.

18. The non-transitory computer readable storage medium of claim 17, wherein the instructions to operate the lock device comprise instructions to extend or retract a bolt of the lock device, thereby conserving battery power when foregoing provision of the instructions to operate the lock device.

19. The non-transitory computer readable storage medium of claim 17, wherein the one or more programs further include instructions for:

receiving an override input prior to providing or foregoing provision of the instructions to operate the lock device;

wherein providing or foregoing provision of the instructions to operate the lock device is based on the received override input.

20. The non-transitory computer readable storage medium of claim 17, wherein the one or more programs further include instructions for:

receiving an override input subsequent to providing or foregoing provision of the instructions to operate the lock device; and providing further instructions to operate the lock device in accordance with the subsequently received override input.

* * * * *